United States Patent [19]

Zink et al.

[11] Patent Number: 5,285,998

[45] Date of Patent: Feb. 15, 1994

[54] INTERNAL VALVE FOR PRESSURE FLUID CONTAINMENT VESSELS

[75] Inventors: Donald L. Zink, Billings, Mont.; Donald G. Zink, New Orleans, La.; John E. Schwartz, Billings, Mont.

[73] Assignee: Montana Sulphur & Chemical Co., Billings, Mont.

[21] Appl. No.: 594,149

[22] Filed: Oct. 9, 1990 (Under 37 CFR 1.47(a))

[51] Int. Cl.$^5$ .............................................. F16K 51/00
[52] U.S. Cl. ................................. 251/144; 251/63.6; 251/335.3; 137/347; 137/454.6; 137/576
[58] Field of Search .............. 251/335.2, 335.3, 63.5, 251/63.6, 144; 137/573, 576, 587, 454.6

[56] References Cited

U.S. PATENT DOCUMENTS

| | | |
|---|---|---|
| 1,474,297 | 11/1923 | Simpson . |
| 1,507,098 | 9/1924 | Walker . |
| 1,555,005 | 9/1925 | Gunther ...................... 137/454.6 |
| 1,566,814 | 12/1925 | Bliss . |
| 2,009,102 | 7/1935 | Bern . |
| 2,109,870 | 3/1938 | Thwaits ...................... 137/31 |
| 2,606,571 | 8/1952 | Ernst . |
| 2,630,181 | 3/1953 | Solvin ....................... 92/141 |
| 2,770,255 | 11/1956 | Goddard .................... 251/335.3 |
| 2,822,823 | 2/1958 | Klein et al. ................ 251/230 X |
| 2,841,359 | 7/1958 | Berck . |
| 2,867,193 | 1/1959 | Ayers ....................... 92/129 |
| 2,882,008 | 4/1959 | Giauque .................... 251/61 |
| 2,888,037 | 5/1959 | Jones et al. ................ 251/335.3 |
| 2,925,987 | 2/1960 | Preismeyer ................ 251/335.3 |
| 2,988,916 | 6/1961 | Waugh ...................... 73/861.77 |
| 3,065,949 | 11/1962 | DeFrees ..................... 251/62 |
| 3,096,077 | 7/1963 | Forsyth ..................... 92/129 X |
| 3,101,094 | 8/1963 | McKenzie .................. 251/335.3 |
| 3,115,894 | 12/1963 | Marx ........................ 137/576 |
| 3,164,358 | 1/1965 | MacSporran . |
| 3,199,534 | 8/1965 | Shaw et al. . |
| 3,257,093 | 6/1966 | DeFrees ..................... 251/61 |
| 3,345,915 | 10/1967 | Dotto ........................ 137/624.14 X |
| 3,388,719 | 6/1968 | Maginnis . |
| 3,392,956 | 7/1968 | DeFrees ..................... 251/144 |
| 3,430,644 | 3/1969 | Lymon ...................... 251/230 X |
| 3,480,034 | 11/1969 | Jerome ...................... 251/230 X |
| 3,548,872 | 12/1970 | Jago . |
| 3,556,465 | 1/1971 | Little ........................ 251/61.1 |
| 3,636,767 | 1/1972 | Duffy ........................ 73/861.77 |
| 3,687,570 | 8/1972 | Ellison . |
| 3,791,230 | 2/1974 | Webb ........................ 74/128 |
| 3,910,551 | 10/1975 | DeFrees .................... 251/144 |
| 3,934,612 | 1/1976 | Kast .......................... 251/335.3 |
| 3,981,325 | 9/1976 | Robinson et al. ........... 137/587 |
| 3,986,525 | 10/1976 | Slaughter, Jr. . |
| 4,036,476 | 7/1977 | Douce et al. .............. 74/128 X |
| 4,052,036 | 10/1977 | Schertler . |
| 4,062,515 | 12/1977 | Bobo ........................ 281/335.3 |
| 4,106,749 | 8/1978 | Behle ........................ 251/144 |

(List continued on next page.)

FOREIGN PATENT DOCUMENTS

| | | | |
|---|---|---|---|
| 3703117 | 10/1987 | Fed. Rep. of Germany ... | 73/861.77 |
| 1262796 | 4/1961 | France ........................ | 92/129 |
| 882201 | 11/1961 | United Kingdom ........... | 137/624.14 |

OTHER PUBLICATIONS

"Internal Tank Safety Shut-off Valve", Saf-Con International, Inc.

Primary Examiner—A. Michael Chambers
Attorney, Agent, or Firm—Banner, Birch, McKie & Beckett

[57] ABSTRACT

An internal valve for pressurized fluid containment vessels having vessel ports. The valve includes a valve seat associated with the vessel port and a valve member movable between a closed position against the valve seat and an open position wherein fluid can flow through the vessel port. A control chamber positioned in the vessel is connected to the valve member. A motive mechanism acting on or in the control chamber, by a control system outside of the vessel, controllably moves the valve member to at least one of the open or closed positions. The control chamber is sealed from fluid in the vessel by a sealing system, which includes a flexing surface against which fluid pressure in the vessel acts to thereby bias the valve member towards one of the open or closed positions.

143 Claims, 8 Drawing Sheets

U.S. PATENT DOCUMENTS

| | | | |
|---|---|---|---|
| 4,114,636 | 9/1978 | Behle | 251/144 |
| 4,237,927 | 12/1980 | Stoller et al. | 137/587 |
| 4,280,679 | 7/1981 | Shaw . | |
| 4,304,252 | 12/1981 | Stanton . | |
| 4,336,727 | 6/1982 | Junkers | 74/128 X |
| 4,366,742 | 1/1983 | Ohta | 92/129 X |
| 4,518,149 | 5/1985 | Gardner et al. | 251/144 |
| 4,526,341 | 7/1985 | Thomas | 251/335.3 |
| 4,527,580 | 7/1985 | Chheda . | |
| 4,565,090 | 1/1986 | Gotanda | 73/861.77 X |
| 4,647,003 | 3/1987 | Hipert et al. | 92/5 R |
| 4,650,157 | 3/1987 | Sillaman et al. . | |
| 4,657,223 | 4/1987 | Lindgren . | |
| 4,752,445 | 6/1988 | Zell . | |
| 4,825,707 | 5/1989 | Rosaen | 73/861.77 |
| 4,872,640 | 10/1989 | Schwartz . | |
| 5,096,976 | 3/1992 | Zink et al. . | |

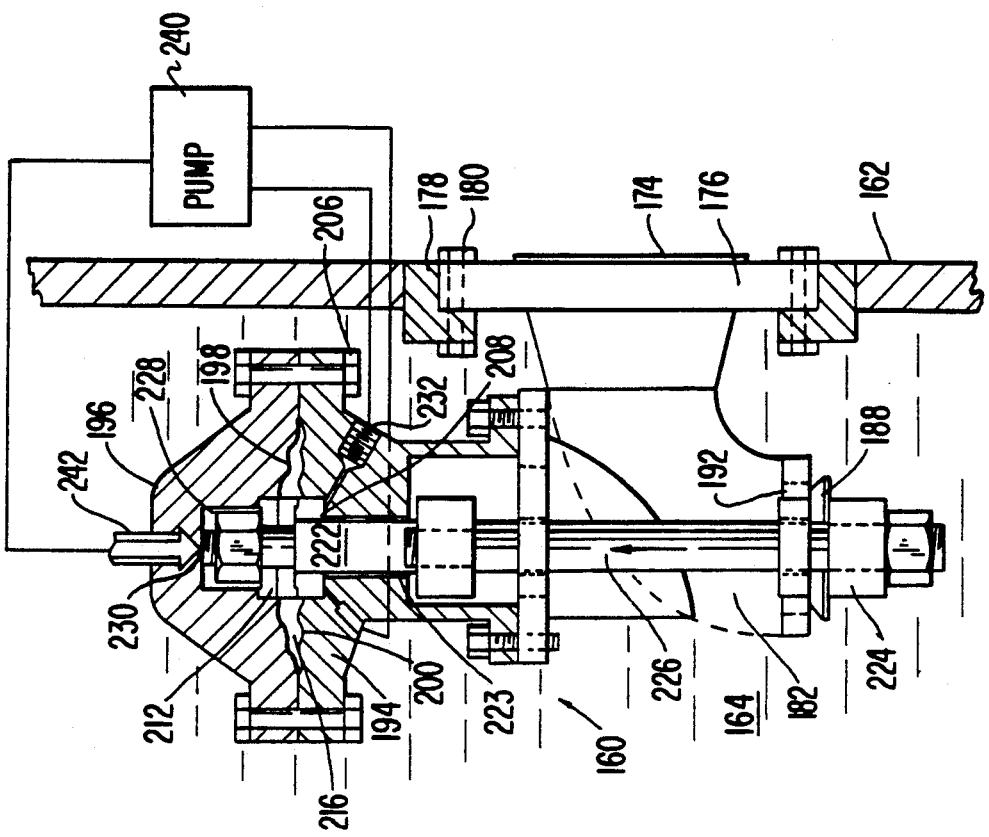
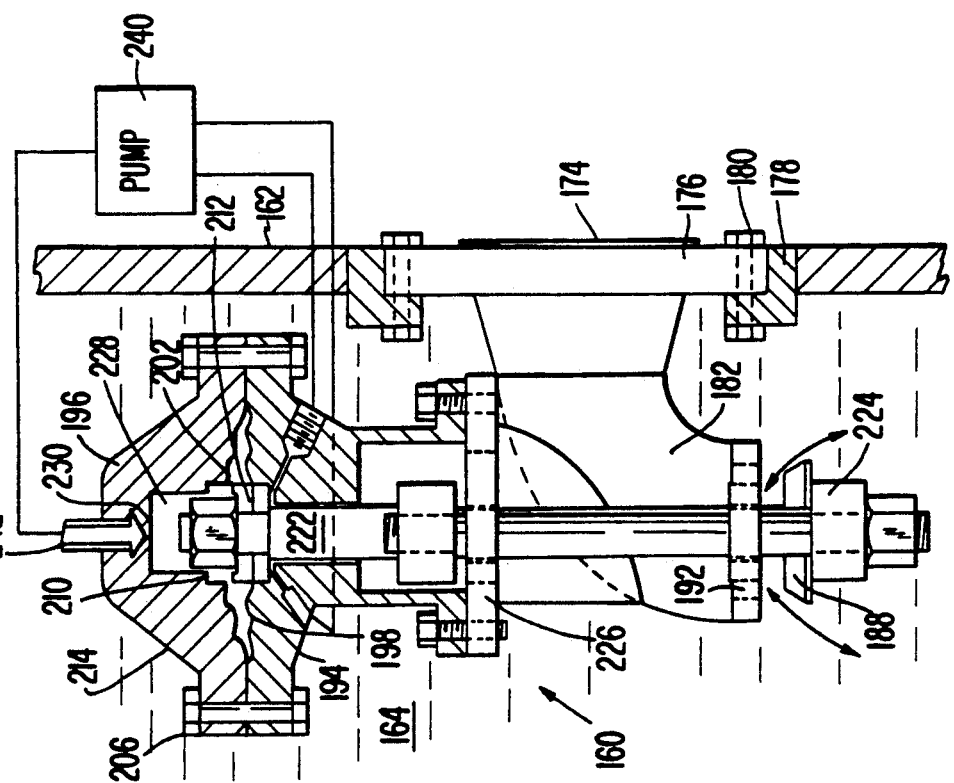

INTERNAL VALVE FOR PRESSURE FLUID CONTAINMENT VESSELS

BACKGROUND OF THE INVENTION

The present invention relates to internal safety valves for fluid containment vessels. It also relates to positive displacement metering pumps for fluid transport vessels.

Society today requires that numerous chemical materials be handled, many of which have hazardous or obnoxious properties. These materials include acids, alkalies, chlorine, ammonia, liquefied petroleum gases, hydrogen sulfide, hydrogen cyanide, sulfur dioxide, mercaptans, fuels, pesticides, radioactive materials, and industrial wastes. To insure that these hazardous, obnoxious, or valuable or sensitive materials do not escape into the environment during their processing, storage and transportation they must be contained in strong vessels or piping systems. These vessels and piping systems must not only provide satisfactory access to the contained materials, but must completely and safely contain them at all times when the escape thereof to the outside environment is unsafe or otherwise undesirable. In some cases, it is even desirable to protect the material itself from the environment.

The unintentional escape of such substances from their containers can have disastrous consequences, including the loss of life, damage to health or property, public inconvenience and even the mass evacuation of public areas. Accordingly, there is a strong need to provide safer containment systems. Although totally sealed vessels providing no access to the outside can be designed to be highly reliable, access to the materials stored in them is of course necessary. Valves with or without mechanical actuator devices to operate them are therefore provided. The containment vessels are typically reliably built, and it is the traditional valvings thereof which are the weak points in the system and thereby reduce the reliability and usefulness of the entire containment system.

In some instances, relatively large leaks or seepage rates from valves are tolerated by users and by society depending upon the particular location and the state, pressure and properties of the stored materials whether hazardous or nonhazardous. However, in the case of extremely toxic, reactive, obnoxious, valuable or sensitive materials even small failures of containment or seepages can be so objectionable as to discourage or even preclude the handling, transportation or storage of them. This problem is growing due to the public's increasing anxiety over the handling of chemical and radioactive materials by both industry and government. Materials which exist in normal conditions as high pressure or liquefied gases are particularly troublesome especially if the materials have a foul odor or corrosive properties. Seepages may not even approach hazardous levels before the users of the materials are exposed to adverse publicity, litigation and extremely stringent and costly regulations. When valve systems used with hazardous, obnoxious or valuable materials fail, the release of the materials can thus have potentially lethal and costly consequences. This failure can result from highway accidents, fires, explosions, earthquakes, storms, misuse, abuse and vandalism.

Known valve systems typically comprise a moveable plug assembly or port which can be manipulated relative to a valve seat to open or close the valve. This manipulation is usually done by transferring a mechanical force from outside of the valve to the plug or seat by means of a valve stem passing through a packing gland or a mechanical seal. These seals or glands are dependent upon tight mechanical closures, and they invariably leak to some measurable extent. These valves also are subject to relatively rapid friction wear causing the seals thereof to ultimately fail. Another known valve apparatus is that disclosed in U.S. Pat. No. 4,872,640. The entire contents of that patent, of each of the references cited therein and any other patents mentioned anywhere in this disclosure are hereby incorporated by reference.

Most known valves are designed such that if they are to be operated in response to instrumentation or personnel, they must be installed outside of their containment vessel, usually on a nozzle or an attached pipe. While the valve body itself might be capable of withstanding external exposure to the contained material, the operators extant cannot withstand such materials or hard pressure. They characteristically are designed to operate in gentle conditions of temperature, pressure and atmosphere. Accordingly, valves and valve actuators are now usually placed outside of the containment vessel, accessible to personnel. This positioning means, however, that the valve is relatively vulnerable to mechanical damage and damage by impacts, fires, abuse and so forth which would not necessarily damage the containment vessel itself. Further examples of valves positioned generally inside of fluid vessels include those shown in U.S. Pat. Nos. 1,474,297, 3,164,358, 3,199,534, 3,388,719, 3,986,525 and 4,280,679.

To make the valves less vulnerable and more resistant to some types of external hazards, such as fire, protective shielding is sometimes used. Its use is generally limited, however, and for transportation vessels, it typically increases the vehicle's weight unacceptably.

Specialized internal excess flow valves have been designed to at least partially remedy this vulnerability problem. These valves close automatically using the system or product pressure at preset flow rates. They do not communicate with the outside environment and cannot be controlled externally. By necessity they are designed not to close unless the rate of flow exceeds the maximum expected flow requirements of the system. They are not adjustable as to response without entry into the vessel. Unfortunately, the nonadjustability of these valves and the need to set a flow level higher than the maximum expected flow limits their usefulness. Further, unintentional escapes of material through leaky or partially broken external systems can result in dangerous or obnoxious releases to the environment at flow rates considerably less than the maximum expected flow rates. As a result, these valves protect only against unlikely circumstances involving total downstream failure.

The vulnerability problem has been addressed in a few cases by installing the seat and plug portions of the valve within the tank or vessel envelope and placing the mechanical linkage on the outside of the tank envelope. These valves have shaft or stem seals outside of the tank envelope, and they are vulnerable to physical impact as well as to stem seal seepage. The theory is that the external portions of the valve can be broken or shorn off in an accident and the internal plug and seat will remain intact. This is unlikely however due the actual mechanical stem linkage of the external system to the internal system. Furthermore, in actual practice, this mounting arrangement is easily damaged when impacted, leaving the system totally unprotected and apt to leak.

The seal or gland leakage problem has been partially addressed in some known devices by using bellows or diaphragm seals on the stems of otherwise conventional valves, or by using magnetically-transparent rigid seals through which magnetic forces are transmitted to mechanically manipulate the valve plug or seal; these valves are generally referred to as electromagnetic solenoid valves. In the case of the bellows or diaphragm seal, the seals are intrinsically weak to accommodate the low forces provided by conventional valve actuators and intrinsically small to fit into conventional valve geometries. They are therefore subject to damage by relatively small forces and cannot withstand the environmental rigors inside containment vessels.

Electromagnetic solenoid valves are limited to small sizes and low pressure operating ranges due to the practical limitations on the power or force output of reasonably small magnetic actuators. These devices attempt to solve the problem of limited force by means of pilot valves. The ports of these pilot devices though are very susceptible to plugging with foreign matter and require that the fluid being contained have a minimum pressure differential relative to the downstream pressure in order for the valve to move or even to reliably stay in one position. Electromagnetically generated forces, furthermore, utilize electric currents sufficient to generate sparks, and therefore are often not suitable for use around flammable or explosive mixtures. No known devices of this type have the stated ability to operate within high pressures or the high pressure containment vessel itself.

Valves which are to be operated or controlled from the outside of the vessel are typically designed to be installed outside of the vessel in whole or in significant part as previously stated. This leaves the valve highly vulnerable to accidental damage and susceptible to seal leakage particularly for high pressure systems. A practical solution to the problem of externally controlling the action of a valve when the valve is fully contained within a pressure vessel in a manner which prevents even seepage leaks from the control device itself was not previously known.

SUMMARY OF THE INVENTION

Accordingly, it is a principal object of the present invention to provide an improved valve design for fluid containment vessels which valve is essentially leak free, and is less susceptible to damage.

It is a further object of the present invention to provide an improved valve design which prevents unintentional, even seemingly insignificant, leaks of stored obnoxious or hazardous chemicals from storage vessels.

It is a still further object of the present invention to provide a secure valve system for fluid transport vehicles which system does not require any heavy protective shielding.

Another object of the present invention is to provide an improved internal valve design for vessels containing highly pressurized fluids which valve is operable and adjustable from outside of the vessel.

A further object of the present invention is to provide an improved internal valve design which is sturdy and is not likely to be clogged or plugged during ordinary use.

A still further object is to provide an improved valve design which can be safely used inside of vessels storing flammable or explosive fluids.

Directed to achieving these objects, a novel internal valve for fluid containment vessels, and particularly for those containing highly pressurized hazardous fluids, is herein provided. This valve includes a valve member positioned within the vessel and movable between a closed position against a valve seat to prevent the flow of fluid through the valve seat and an open position wherein fluid can flow relative to the vessel interior through the valve seat. A flexible sealing enclosure, such as a bellows or a diaphragm, is connected to the valve member. The flexible enclosure includes a flexible enclosure wall positioned so that the fluid pressure in the vessel bears directly on the wall and thereby biases the valve member connected thereto towards either its open or closed position. A motive means positioned at least partially inside of or acting directly on the flexible enclosure, or sealed control chamber, moves the valve member to its open or closed position as needed when activated by an operating system external to the vessel.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 5 is a side partially sectional view of another internal valve of the present invention illustrated in an open position.

FIG. 6 is a view of the valve of FIG. 5 illustrated in its closed position.

DETAILED DESCRIPTION OF PREFERRED EMBODIMENTS OF THE INVENTION

Figure 1:
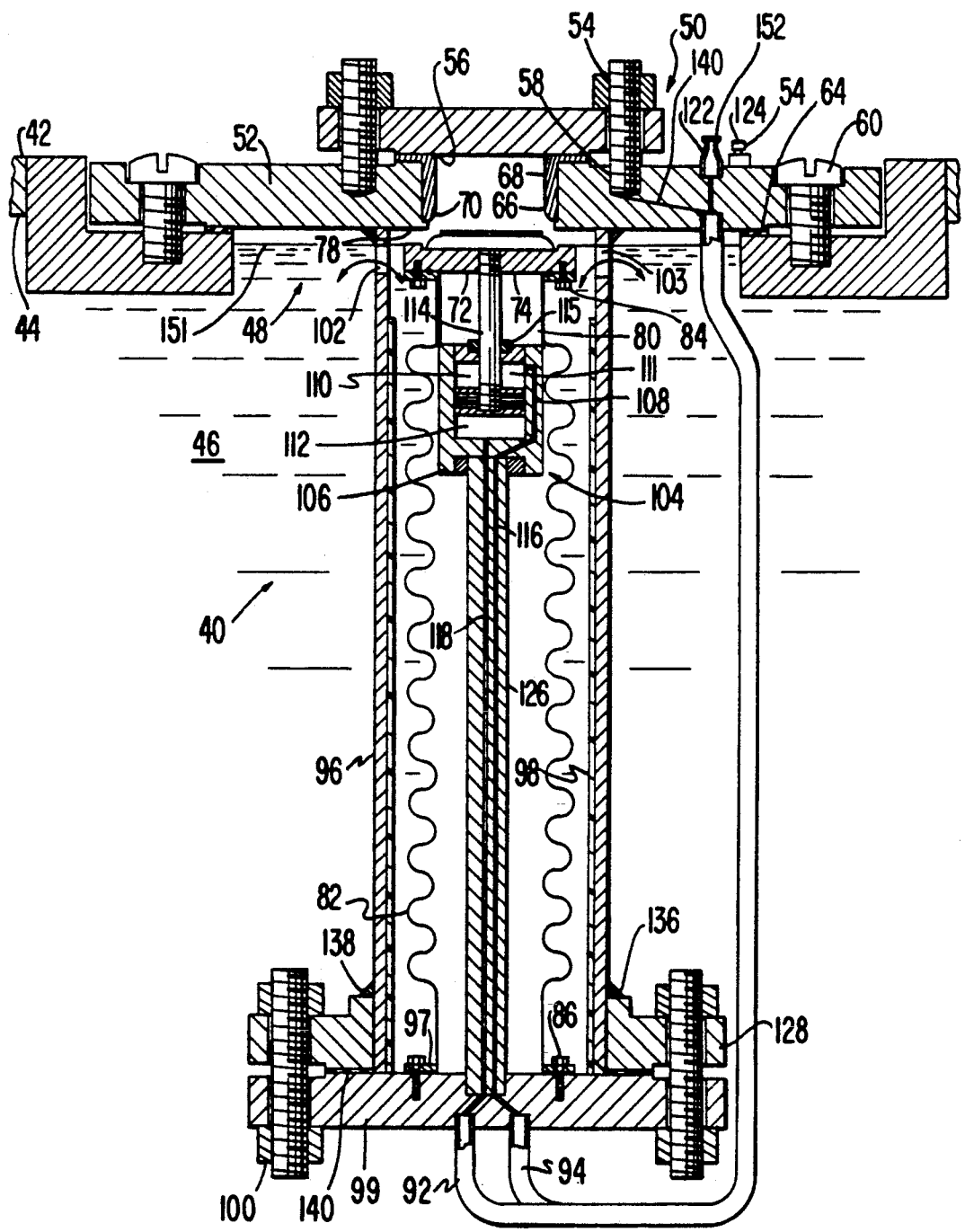
FIG. 1 is a cross-sectional view of an internal valve of the present invention.
Figure 2:
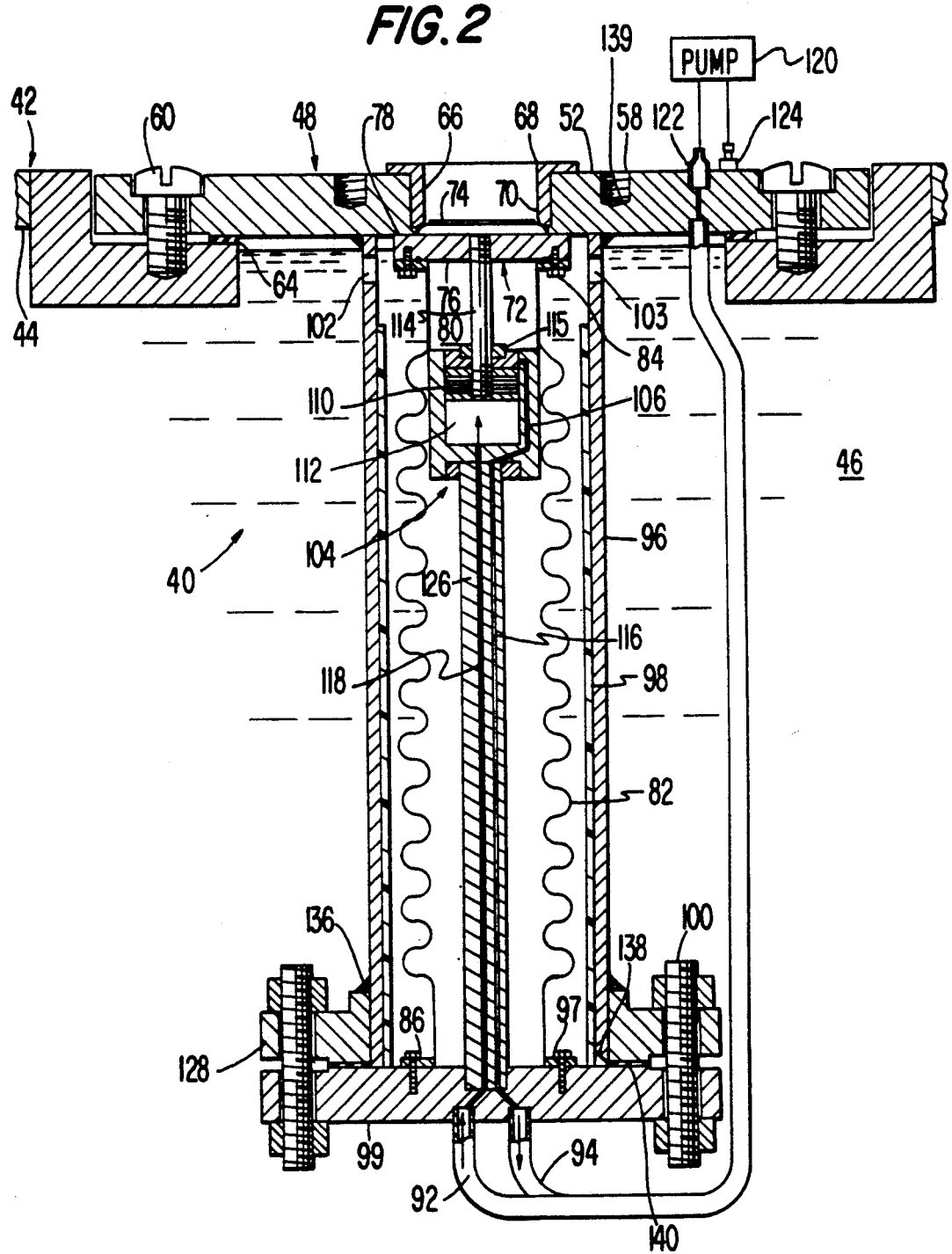
FIG. 2 is a cross-sectional view of the valve of FIG. 1 illustrated in its closed position and with the mounting flange thereof removed.

Referring to FIGS. 1 and 2 an internal valve system of the present invention is illustrated generally at 40. Valve system 40 is mounted in a pressurized, hot or corrosive fluid containment vessel shown generally at 42 having a vessel or shell wall 44 with the interior thereof filled with a (pressurized) fluid 46, such as hydrogen sulfide pressurized at four hundred to five hundred pounds per square inch, for example. The vessel 42 can be any transportation vessel such as a tank car, a tank truck, a tank cylinder or any stationary vessel.

The vessel outlet is illustrated generally at 48 and is closable by a blind flange 50, as shown in FIG. 1, secured to a mounting flange 52 of the shell wall 44 by bolt fasteners or cap screws 54 and with a suitable gasket 56 sandwiched therebetween. These fasteners 54 are threaded into tapped blind holes 58 in the mounting flange 52. The closing flange 50 is applied for shipment purposes and is removed, as illustrated in FIG. 2, for valve operation.

The mounting flange 52 is mounted flush with the exterior wall 44 of the pressure vessel 42 by means, for example, of a plurality of Allen head cap screws 60. This provides a desirable protective flush mounting of the mounting flange 52 to the exterior of the vessel 42 with a different wrench configuration than is needed for the removal of the blind flange 50 in accessing the valve discharge port. A gasket 64 between the mounting flange 52 and the vessel wall 44 forms a seal therebetween. By unscrewing the screws 60 the entire valve 40 can be easily removed from the vessel 42 for servicing, adjustment or replacement. This mounting arrangement also makes the installation of the valve 40 from outside of the vessel 42 relatively easy. Alternatively, the mounting flange 52 can be a part of the shell wall 44 and not removable with respect thereto. In such case, the valve 40 is affixed to the vessel wall 44 and is not removable from the vessel 42 from the outside thereof.

A valve seat 66 is threadably mounted into the flange outlet 68 and can be unscrewed therefrom by means of a simple wrench (not shown) and removed for maintenance purposes. The removable seat 66 is sealed to the mounting flange 52 by means of an O-ring system 70, or by adhesives, sealants or gaskets. Alternatively, the seat 66 can be constructed as part of the mounting flange 52 itself in which case it would not be a separately renewable component.

A valve plug assembly shown generally at 72 includes a plug member 74 formed of a replaceable resilient material and configured to mate tightly with the valve seat 66. The plug member 74 is removably mounted on a support member 76, which is preferably metallic, and which provides a secondary, tight metal-to-metal contact around the circumference of the seat at location 78 in the event of the loss of or damage to the primary resilient plug material. This sealing arrangement is best shown in FIG. 2. This resilient material is selected to be compatible with the fluid 46 to be contained in the vessel 42. In the case of hydrogen sulfide this resilient material can be glass or carbon filled Teflon, for example.

The plug assembly 74 is mounted upon or forms one end of a control chamber 80. The sides of the control chamber 80 are formed by a bellows cylinder 82 which in turn is attached to the other end of the control chamber 80. The ends of the bellows cylinder 82 are attached as by threaded studs 84, 86 at the two ends of the chamber 80 and sealed by O-rings 88 and 90. Gasketed joints can be eliminated by forming the entire bellows-and-internal double acting cylinder assembly as a single welded construction. The chamber 80 is thus completely sealed from the fluids 46 of the vessel 42 and from the exterior of the vessel 42 except for the communication provided by the control lines 92 and 94.

The bellows cylinder 82, which defines the walls of the control chamber 80, can be of standard manufacture and its construction material should be compatible with the fluid 46 of the vessel 42. Stainless steel is an example of a possible compatible material, and other strong flexible metal, plastic or rubber materials can also be used, and the bellows can be formed of a laminated or multi-layer construction. Examples of known bellows-piston valves are those shown in U.S. Pat. No. 2,009,102, 2,841,359, 3,687,570, 4,657,223 and 4,752,445. The bellows cylinder 82 will be of a sufficient strength to withstand the internal pressure of the vessel 42 and of a sufficient length to allow for the movement of the plug assembly 72 over its full stroke length without undue fatigue even after tens of thousands of cycles. The bellows cylinder 82 is preferably always in compression to some extent and never in extension. This prevents "snaking" thereof which is a characteristic of bellows in extension. The bellows cylinder 82 in compression acts as a spring biasing the plug assembly 72 to a closed position as shown in FIG. 2. The spring rate of the bellows cylinder 82 can be selected to overcome the forces exerted thereon by the fluid 46 in the vessel interior, if desired.

Alternatively, the value 40 can be designed to be in a normally "open" position by shortening the bellows cylinder 82 slightly or moving it a slight distance away from the valve seat 66. This, however, puts the bellows cylinder 82 in extension during closing, which is less desirable, as previously discussed. More preferably, the seat/plug configuration can be altered to allow the valve 40 to be open when the bellows cylinder 82 is relaxed and closed when compressed.

A rigid support cylinder 96 is securely welded to the mounting flange 52 at its upper end and thereby rigidly connects the chamber 80 relative to the vessel wall 44. The support cylinder 96 provides guiding and stabilizing functions and also protectively envelopes the critical bellows cylinder 82. Contact wear between the bellows cylinder 82 and the support cylinder 96 can be minimized by providing a Teflon sleeve 98 within the support cylinder 96. The bellows cylinder 82 is mechanically fastened to the support cylinder 96 at the end opposite from the plug assembly 72 by any convenient fasteners such as the studs 86. This fastening system is sealed by an O-ring 97 to an end mounting plate 99 which is bolted by bolts 100 to the support cylinder 96. This mounting provides for the control chamber 80 by fixing it at one end such that the linear expansion of the chamber 80 causes the movement of the plug assembly 72 towards and subsequently against the valve seat 66. The support cylinder 96 is not a sealed unit however, and passage for the fluid 46 of the vessel 42, as indicated by the arrows in FIG. 1, is provided by ports 102 and 103 therethrough conveniently located at the top (or bottom) of the support cylinder 96.

A standard double-acting piston assembly shown generally at 104 is used in valve 40 and includes a cylinder or housing 106 defining a cavity 108, a piston 110 slidable within the cavity and defining on opposites sides thereof first and second chambers 111, 112, and a piston rod 114 secured at one end to the piston 110 and at the opposite end thereof to the plug assembly 72, and passing through the housing 106 through a piston seal 115. The control lines 116 and 118 communicate with the chambers 111 and 112, respectively, and are controlled from outside of the vessel. This control is accomplished by means of applying a pressurized fluid, as by means of a pump shown schematically in FIG. 2 at 120, to one or both of the external hydraulic fittings 122, 124. These hydraulic fittings 122, 124 are shown offset for ease of convenient explanation but in the preferred design they are aligned into the plane of FIGS. 1 and 2. The pump 120 therefore can pressurize one fitting 122 (or 124) while depressurizing the other fitting 124 (or 122). The pump 120 supplies any suitable type of pressurized fluid, such as hydraulic fluid, pressurized grease or pressurized gas.

The control lines 116, 118 pass through an elongated member 126 within the bellows cylinder 82 and which is threadably secured at its upper end to the housing 106 and at its lower end to mounting plate 99. The mounting plate 99 in turn is secured by bolts 100 to a cylinder flange 128 welded by welds 136 and 138 to the outside and bottom, respectively, of the support cylinder 96. A suitable gasket 140 is sandwiched therebetween to form a good seal.

An optional safety feature of this valve is illustrated in FIGS. 1 and 2. A small connecting passage 142 is provided between one or both of the control lines 92, 94 where they pass through the mounting flange 52 and the blind flange stud hole 58. The stud 60 is replaced with a special cap screw 146 (see FIG. 3). When this cap screw is loosened or improperly tightened, fluid will escape past the gasket 139 at the bottom of the stud hole 58 causing the lines 92 or 94, if they are pressurized, to depressurize. This allows the plug assembly 72 to move towards its relaxed position, which in the case of the valve design illustrated in the drawings is its closed position.

Figure 3:
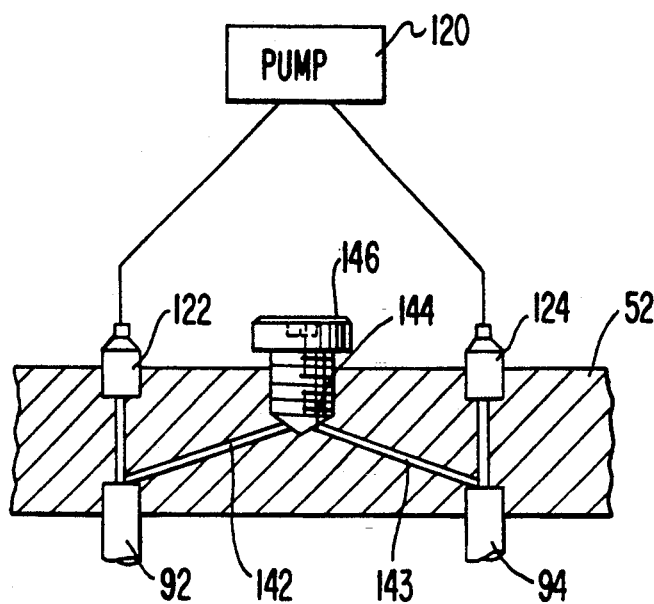
FIG. 3 is an enlarged cross-sectional view of an alternative fitting arrangement for the valve of FIG. 1.

Alternatively, two passages 142, 143, one from line 116 and the other from line 118, can converge upon one (or more) of the stud holes 58 of the blind flange 52, as depicted in FIG. 3. Normally sealed from each other and outside by a gasket 144 when the cap screw 146 is properly applied, the two passages 142 are connected together when the cap screw 146 is loosened. This loosening allows the pressure in both chambers 111, 112 of the double-acting piston assembly 104 to equalize and thereby allows the normally closed valve to move to its closed position as the bellows cylinder 82 relaxes. The normally closed characteristic is determined by the length and spring rate of the bellows cylinder 82. In a normally closed configuration, the spring rate is selected to overcome the force exerted thereon by the maximum vessel working pressure as effected by the fluid pressure through the ports 100, 102.

Figure 4:
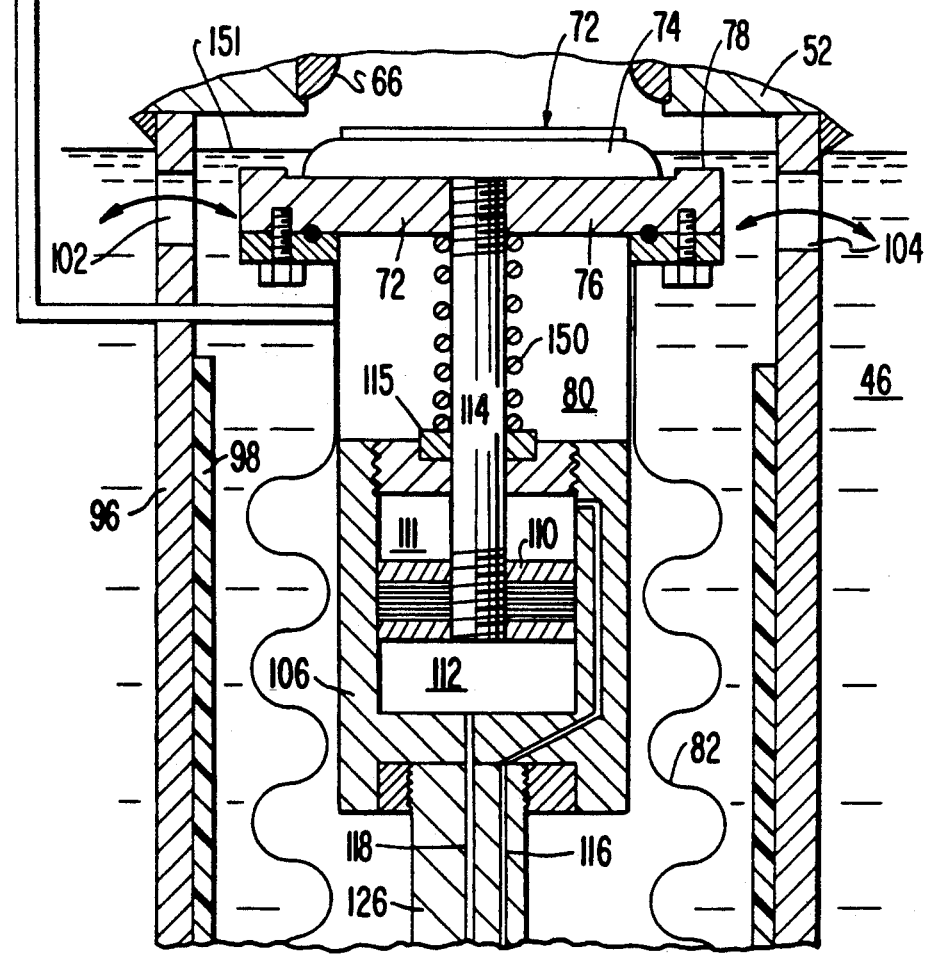
FIG. 4 is an enlarged sectional view of an alternative of the pressurized chamber and plug of the valve of FIG. 1.

It may be desirable to provide by separate means outside of the vessel 42 for the direct pressurization of the control chamber 80 with a pressurized fluid, either a gas or liquid, from a pump such as is shown schematically at 148. This arrangement is partly shown in FIG. 4 and can assist in the closing of the valve plug assembly 72. One connection of the pump 148 to the chamber 80 is illustrated in FIG. 4. A preferred connection, however, and referring to FIG. 1, has it pass down through mounting flange 52, outside of the support cylinder 96 and up through the end mounting plate 99 into the control chamber 80. It thereby provides an alternate means for forcing the valve shut. It can also provide a means of externally monitoring both the integrity of the seal and the valve position. By selecting different spring lengths and/or rates, a normally open valve mechanism with a similarly configured valve, with or without optional separate springs, as mentioned above can be constructed. If separate springs are desired they can be placed inside of the control chamber 80, as illustrated in FIG. 4 at 150, to avoid exposure to the vessel fluid 46.

A positive closure of the plug assembly 72 can be assisted by the pressure in the vessel itself. This closure is further assisted by the double-acting piston cylinder 104 which can be easily pressurized by the user through lines 116, 118 to force the valve plug assembly 72 closed tightly against the valve seat 66. When the vessel 42 is a transportation vessel, the loading/unloading valve 40 would normally be closed for transportation and left closed except when actually needed to gain access to the interior of the vessel.

The safety relief port(s), if any, of a transportation vessel or any other pressure vessel would typically be equipped with a normally open internal valve, and such valve would be left open except in unusual circumstances wherein it is desirable to be able to completely isolate a safety relief valve for repairs. Pressure relief valve systems on pressure vessels can be further improved using this type of internal valve which has been modified so that it is shipped in a closed position and automatically opens on high pressure in the vessel and can be reclosed, if desired. This can be done by providing a mechanism (not shown), such as a bellows or piston, in the vessel which uses internal vessel pressure to pressurize the fluid needed to open the valve, as by putting pressure on tube 94 in FIG. 2 for example. This mechanism allows the valve to be automatically opened when the vessel pressure rises above a predetermined limit.

This valve 40 when properly installed on a pressure vessel 42 can be easily removed from the vessel by trained personnel without entering the vessel. Only depressurization and suitable personal protective clothing need be worn by the personnel if the valve 40 is mounted above the liquid level 151 in the vessel 42.

Furthermore, this valve 40 is fully protected from fire, impact, abuse, corrosion, weather and so forth by the shell of the vessel wall 44 itself. All of the externally protruding parts, such as the hydraulic fittings 122, 124, the blind flange 52 and blind flange bolts 54 can be removed, either accidently or intentionally, with the valve 40 in the closed position, without any vessel fluid 46 escaping.

The valve 40 has no packing or other frictional seals to leak. Even failure of the substantial and external bellows seals, while unlikely if properly designed, does not result in either the valve 40 being rendered inoperable or in the vessel fluid 46 being lost to the environment. Failure of the bellows cylinder 82 results in the pressurization of the bellows control chamber 80 only which tends, according to the preferred design herein, to close the plug assembly 72. The vessel contents must still pass by the highly reliable piston seal 115, enter the cylinder or housing 106 and pass through the resident control fluid before arriving at the hydraulic fittings 122, 124. These fittings, when not in use, are preferably sealed with caps 152, 154, as shown in FIG. 1. When in use the fittings 122, 124 are connected to the high pressure pump 120 which further makes leakage difficult. The fittings 122, 124 themselves preferably contain automatic valves which prevent the flow of fluid except when connected to hydraulic pump lines. These multiple lines of secondary leakage defenses ensure that leakage through the control mechanism is essentially impossible, which is a significant improvement over existing valves. This valve 40 can be remotely controlled easily either manually or automatically using standard control instrumentation. For example, the valve 40 can be easily made to close on excess flow, loss of line pressure or tank car movement, or in the event of fire or downstream disruption.

Figure 7:
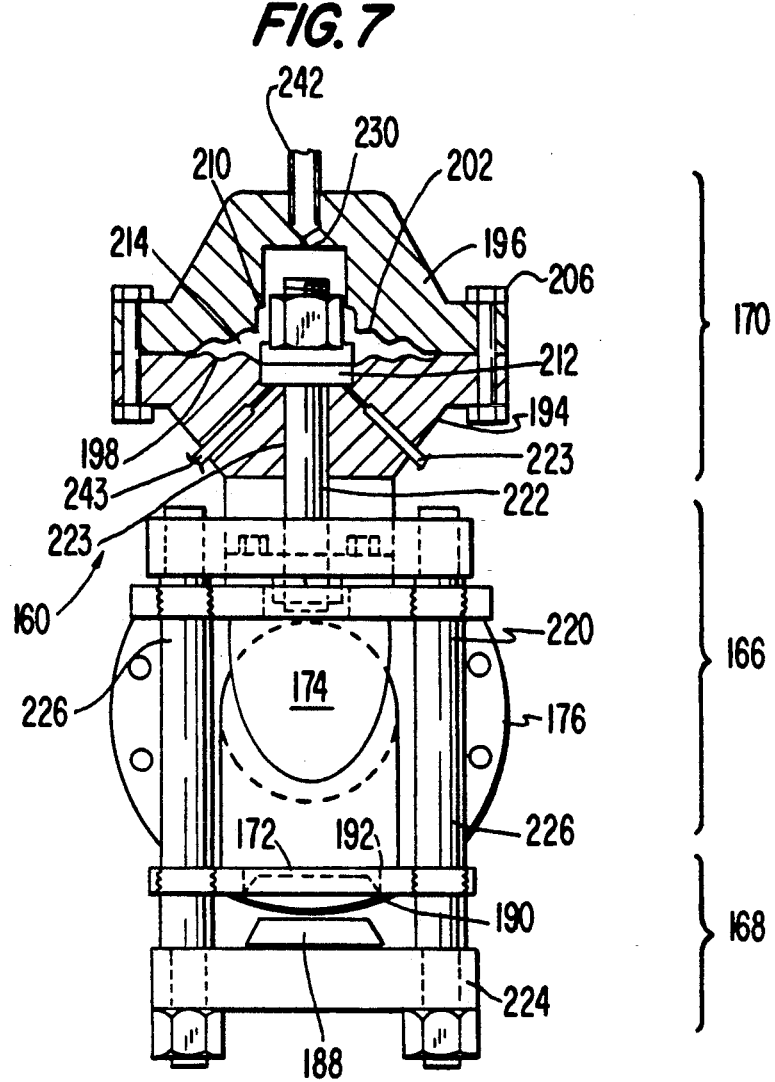
FIG. 7 is an end partially sectional view of the valve of FIG. 5.

Another valve of the present invention is illustrated in FIGS. 5-7 generally at 160. Valve 160 similarly is designed to be contained within a fluid containment compartment of a pressure vessel shown generally at 162. This vessel 162 typically is adapted to contain fluid 164, either gas or liquid, and usually under pressure, and can be a tank car, highway tanker, stationary vessel, cylinder or the like. As illustrated in FIG. 7, the valve comprises a valve body portion 166, a valve portion 168 and valve actuation portion 170, as designated by the respective brackets in that drawing. The preferably metal valve body portion 166 includes an inlet opening 172 and an outlet opening 174 positioned at the rear of the valve 160 through the flange 176. The flange 176 is bolted to the wall 178 of the vessel 162 by bolts 180. The flange 176 can be omitted and the valve 160 welded or otherwise suitably attached directly to the exit nozzle or piping leading to the exterior of the vessel 162.

The valve portion 168 defines a cavity 182 within the valve body portion 166 and disposed between the inlet and the outlet openings to form a passage within the body portion 166. A valve member or plug 188 is disposed adjacent to the cavity 182 and movably engageable with the sealing surface of the opening. The inlet opening 184 is preferably provided with a replaceable valve seat member 192.

The valve actuating portion 170 includes lower and upper body sections 194 and 196. The lower body section 194 may, but need not, be constructed as one piece with the valve body portion 166. Instead of a bellows sealing element as was provided in the embodiments of FIGS. 1 and 2, a diaphragm sealing element 198 is preferably used for valve 160. The diaphragm sealing element 198 must be sufficiently flexible over at least a part of the surface thereof to allow for the operation of the valve over a useful service life without undue fatigue. The surfaces 200, 202 of the body sections 194, 196, respectively, are preferably shaped or molded to evenly conform to and completely support the diaphragm sealing element 198 at its two extremes of travel as is apparent from a comparison of FIGS. 5 and 6. The diaphragm sealing element 198 is formed of a strong flexible material, such as metal (e.g., stainless steel), plastic or rubber, suitable for exposure to the fluid 164 in the vessel 162 and to the control fluid. It preferably has a laminated or multi-layered construction. The diaphragm sealing element 198 is sealed between the body sections 194 and 196 with a gasket between itself and the body section 196. The body sections 194 and 196 are held firmly together by any convenient means, as by bolts 206.

The surfaces 208 and 210 of the body sections 194 and 196 are shaped to support and limit the movement of the piston or pressure plate 212 at its two intended extremes of travel, as is apparent from FIGS. 5 and 6. The pressure plate 212 is attached firmly to the diaphragm sealing element 198 to form a gasketed seal, so that no fluid communication is possible between the variable volume upper and lower chambers 214, 216. The pressure plate 212 has an effective cross-sectional area in the chamber which is substantially greater than the cross-sectional area of the valve port area circumscribed by seat member 192.

One end of a connecting section 220 is firmly attached to or is a part of the piston assembly and includes a rod 222 passing through a passageway 223 in the body section 196 towards valve body passage 182. This passageway 223 is preferably aligned with the valve inlet opening 172 of the valve body portion 162.

Connecting section 220 has one end thereof operatively connected to the movable valve member 224. Connecting section 220 preferably has a yoke portion 226 secured to the rod 222. The yoke portion 226 attaches at one end to a movable valve section 224 as shown and at its opposite end to the rod 222, which in turn is connected to the pressure plate 212. Less advantageously, the connecting section 220 can connect directly to the movable valve member 224 by passing through a seal (not shown) and into and through chamber 182. If this direct connection is made, the seal used can be another bellows or diaphragm to minimize the possibility of any leakage.

The application of force to the surface of the pressure plate 212 facing the variable volume chamber 228 is transmitted directly by connecting section 220 to the movable valve member 224 and thereby to the plug 188 causing the plug to move towards the extreme open position shown in FIGS. 5 and 7 as the volume of the chamber 182 increases towards it maximum. The force can be applied to the pressure plate 212 by any convenient means through the upper passageway 230 in the body section 196. Valve closure can also be assisted by applying pump pressure through port 232. In this case, the lower chamber 216 is preferably sealed from the fluid of the vessel to thereby effectively form a second control chamber. The force preferably is applied by injecting a pressurized fluid from a pump as shown schematically in FIGS. 5 and 6 at 240. The pump 240 can be a source of compressed gas or hydraulic fluid which is introduced into chamber 228 through passage 230 in the connecting channel or tubing 242 leading to the outside of the pressure vessel 162.

Figure 8:
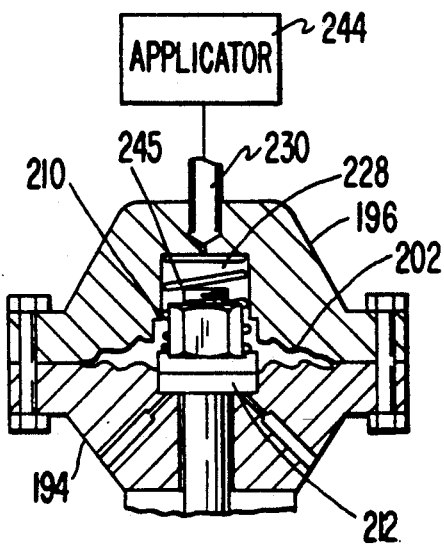
FIG. 8 is a sectional view of the upper portion of the valve of FIG. 7 illustrating a variation thereof.

An alternative method of applying force to the pressure plate 212 is illustrated in FIG. 8. It is seen therein that the force is applied by applying heat to a suitable fluid contained in the variable volume chamber 228 and/or passageways 230, 243 causing thermal expansion and pressurization within the cavity or passage. The heat can be delivered to the fluid by means of steam or suitably limited electric power conducted to the actuator through one or more sealed conductors via channel or via electric induction through a magnetically-permeable metal wall. A control mechanism thus need not penetrate the vessel wall. In this manner a non-flexing, highly reliable secondary barrier to the inadvertent escape of vessel contents can be provided since the secondary conductor tubes can readily be sealed from both the contents of chamber and the exterior world and since the means of delivering energy can also be readily sealed from the outside environment. Such a system does not allow escape of the vessel contents even in the unlikely event of diaphragm or channel failure.

Alternatively, and perhaps less advantageously, the force can be applied by means of a fixed or movable, solid push/pull rod or screw passing directly to the outside of the vessel through the passageway 230 and the channel 242. (Examples of known screw jack valves are shown in U.S. Pat. Nos. 1,474,297, 1,507,098 and 1,566,814.) Alternatively, the passageway can contain an electrically-driven gear motor or solenoid device which applies force to the pressure plate 212 and is powered by conductors traveling through the channel 242 to the exterior of the vessel 162. The power sources and/or force applicators mentioned in this paragraph are shown generically and schematically in FIG. 8 at 244. Applicator 244 can be either inside or outside of the vessel and can develop its pressure entirely based on heat. It is also within the scope of this invention to provide a tension or compression spring 245 in the chamber 228 to bias the pressure plate 212 up or down, as desired.

When the valve 160 is to be moved to its open position as shown in FIGS. 5 and 7, force is applied to the pressure plate 212 by any of the means described herein and preferably controlled from outside of the vessel 162. This force causes a downward movement of the pressure plate 212, the connecting section 220 and the movable valve section 226 and the plug 188, thereby opening up inlet opening 172 and allowing the vessel fluids to flow unimpeded through the valve and outlet piping of the vessel 162. When the valve 160 is to be closed or moved to its position as shown in FIG. 6, the applied force is removed. The vessel pressure is exerted through closing passages 243 and 244 against the underside of the pressure plate 212, the diaphragm sealing element 198 and also against the valve portion causing the valve portion, the connecting section 220 and the piston 222 to move towards the opposite extreme position (the up or raised position as shown in FIG. 6), thereby diminishing the size of the variable volume chamber 228. This movement closes the valve 160. If the pressure in the vessel 162 is insufficient to close the valve 160 under anticipated conditions, then a spring 245 as shown in FIG. 8 can be used to assist in the closure process. This spring 245 preferably is placed within the chamber 228 (and passage 230), operatively connected to the piston 212 and connecting section 222 and still protected by the diaphragm sealing element 198 from any contact with the fluid in the vessel 162. (In the illustrated case, the spring is in extension when the valve is open.)

The configuration of the valve 160 as illustrated in the drawings is normally closed. It is also within the scope of the present invention, however, to modify this valve so that it is normally open by a number of simply modifications in the relationship of the plug to the seat and the actuator to the valve. Further, the valve 160 illustrated in FIGS. 5-7 is not intended to be removable from the outside of the vessel 162, in contrast to the valve 40 illustrated in FIGS. 1 and 2. Rather, it must be installed and serviced by actually entering the vessel 162.

Figure 9:
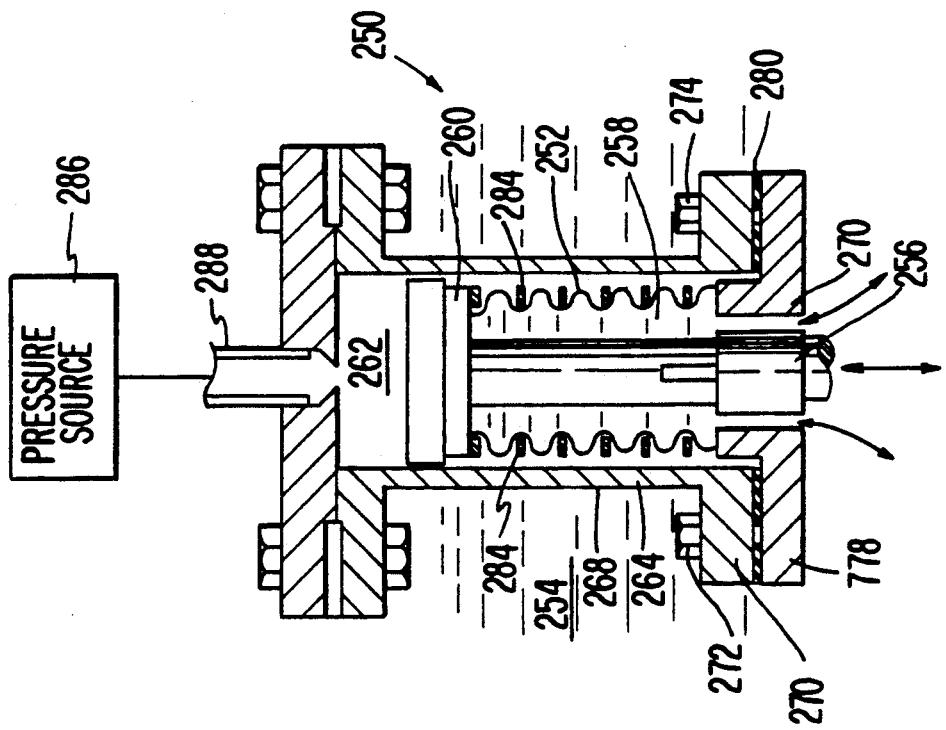
FIG. 9 is a cross-sectional view of another internal valve of the present invention.

Referring to FIG. 9 another valve design of the present invention is illustrated generally at 250. The sealing section of the valve actuator portion of this valve 250 differs from the sealing section of the valve actuating portion of the valve 160 in FIGS. 5-7 in that a bellows 252 is utilized instead of a diaphragm sealing element 198. This valve 250 is similarly intended for installation within the envelope of a pressure vessel.

In use, pressure from the contained vessel fluid 254 (gas or liquid) flows around the rod member 256 into the cavity 258 within the bellows 252 and against the underside of the piston or pressure plate 260 mounted on top of the rod member 256. The top of the bellows 252 is affixed and sealed to the pressure plate 260. A pressure cavity 262 is formed by the body 264 of the actuator, the bellows 252 and the pressure plate 260. The bellows 252 is affixed and sealed at its bottom end to the body 264, and the other bellows end and the pressure plate 260 are free to move up and down in the sealed cavity 262. There is no fluid communication between the cavity 262 and interior of pressure vessel which contains this valve 250. The body portion 264 can be made in one piece or preferably, as shown, as an assembly comprising two or more pieces 268, 270 connected by bolts 272, 274 through their flanges 276, 278 and sealed by a gasket 280 sandwiched therebetween.

The bellows 252 is preferably selected so that its fully relaxed length is no shorter than the length of the interior of the cavity 262 such that the bellows is always at least somewhat compressed in length regardless of the position of the pressure plate 260 within the cavity. This minimizes any natural "snaking" or distortion characteristic of the bellows in extension when exposed to higher internal and external pressures. Furthermore, in order to insure and maintain the correct alignment of all of the corrugations of the bellows 252 during operation, spacer washers or rings 284 can be positioned in the grooves between the corrugations.

The neutral or relaxed position of this actuator of the valve 250 of FIG. 9 is with the pressure plate 260 at the top of the cavity 262, being held there by the natural spring action of the bellows 252 and by the pressure of the internal vessel fluid 254, as previously described. Pressurized control fluid from a pressure source as shown schematically at 286 is introduced into the cavity 262 from outside of the vessel via conduit 288. This pressurized control fluid overcomes the natural spring characteristic of the bellows 252 and the internal pressure of the vessel fluid 254 exerted on the inside of the bellows 252 and against the bottom surface of the pressure plate 260 and moves the plate towards the bottom of the cavity 262 thereby compressing the bellows 252. The connecting rod member 256 which is attached to the piston 260 on the inside of the bellows 252 transmits force and linear movement to a valve assembly (not shown in FIG. 9) which can be similar to the valve section of FIGS. 6-8, for example. If attached in place of the actuator portion of FIG. 2, this actuator would produce a normally closed valve design with or without the assistance of vessel pressure and/or springs. A normally open configuration can also be readily produced as would be apparent to one skilled in art.

Normally open and closed versions of the externally removable valve apparatus described in FIG. 1, for example, can also be readily constructed using this simpler form of the bellows actuator rather than the more positive bellows sealed, double-acting cylinder arrangement illustrated in FIG. 1. The valve 250 of FIG. 9 form of actuator depends upon spring action, either from the bellows 252 itself or from separate assisting springs, and/or the internal pressure of the vessel to move it to one of its two extreme positions. This is in contrast to the double-acting piston cylinder 104 described and illustrated in FIG. 1 which can be moved positively to any position and held there by means of external pressure if desired.

Any other suitable means of applying the force, including any of the various alternative means of applying force to the piston 212 of FIGS. 6-8 (the diaphragm sealed actuator embodiment), can be readily used to apply force to the piston of the bellows actuator in FIG. 9 with similar results.

Figure 10:
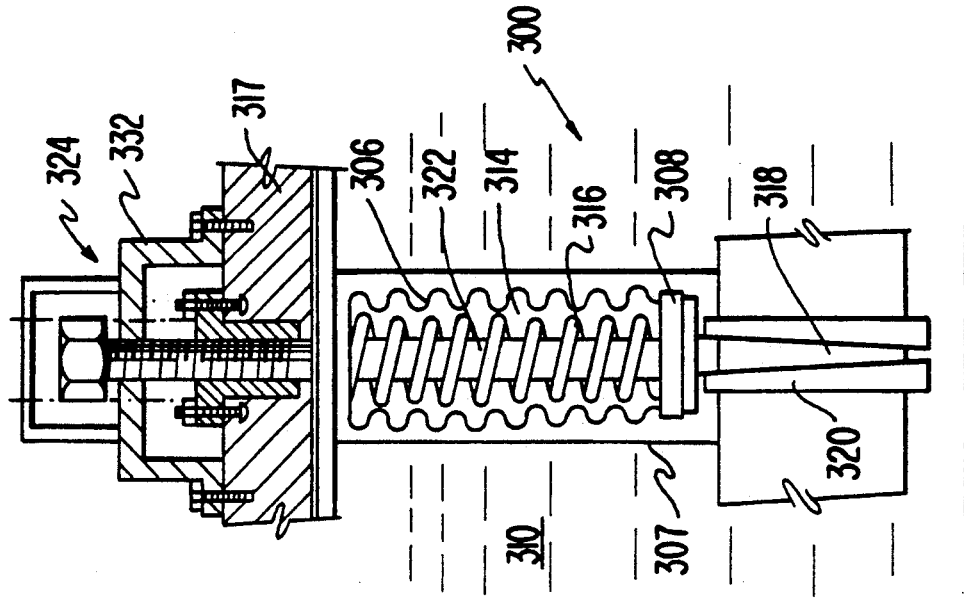
FIG. 10 is a side sectional view of another valve of the present invention.
Figure 11:
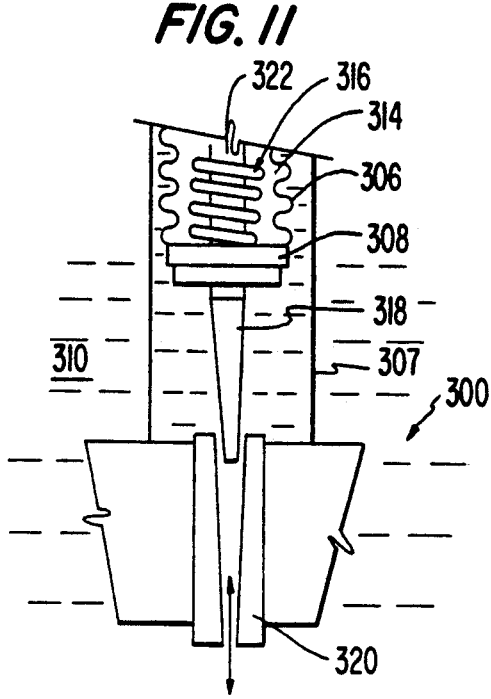
FIG. 11 is an enlarged view of the lower portion of the valve of FIG. 10 illustrating the valve in an open position.

A gate valve apparatus of the present invention is illustrated generally at 300 in FIGS. 10 and 11. This apparatus 300 has a valve actuating portion that includes a flexible sealing section, such as a bellows 306, of sufficient flexible length to allow for a long cycle life without fatigue failure and positioned within a tube 307. A piston or pressure plate 308 is positioned at the lower end of the bellows 306, and fluid 310 in the pressure vessel bears against the outside of the bellows 306, rather than the inside thereof as in the valve 250 of FIG. 9. The upper end of the bellows 306 is attached and sealed to the wall of the vessel containing this valve 300 thereby creating a chamber 314 inside of the bellows 306 which is isolated from the fluid 310 of the vessel and which can be isolated also from contact with the external world if desired.

The downward force applied to the pressure plate 308 from within the chamber 314 can overcome forces, such as the pressure of the fluid 310 or the spring forces from the optional internal biasing spring 316, which can tend to compress the bellows 306 and cause the pressure plate 308 to move away from the wall 317 of the vessel. This piston motion moves the gate valve member 318 which is operatively affixed to the end of the piston into engagement with a seating section 320 of the valve, as best shown in FIG. 10. It is also within the scope of this invention to position the spring outside of the control chamber as might be done in the embodiment of FIG. 9.

Figure 12:
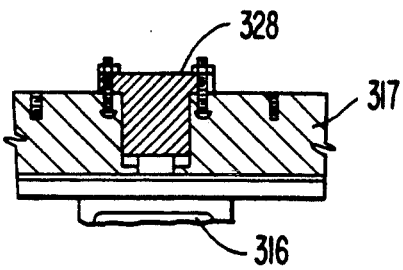
FIG. 12 is an enlarged view of the top portion of the valve of FIG. 10 with the top shield portion thereof removed and a cap inserted therein.

Removal of this downward force and/or application of an upward force on the pressure plate 308 causes the bellows 306 to compress and the pressure plate 308 to move upwards towards the wall 317 of the vessel and thereby opening the gate valve member 318; this open position is illustrated in FIG. 11. The externally applied force can be applied, in either direction, to the pressure plate 308 by means of an optional connecting member 322 passing between the pressure plate 308 and the exterior through the chamber 314 within the bellows 306 and to the wall 317 of the vessel. A simple hand-operated screw jack, as shown in FIG. 10 at 324, can be used to develop the upward or downward force as desired and applied to the connecting member 322 and to the pressure plate 308. Preferably, all portions of the hand-operated screw jack 324 protruding beyond the wall 317 of the vessel 312 can be removed prior to shipment or when not in use. The passage through the vessel wall 317 into the chamber 314 of the bellows 306 can then be sealed with a preferably flush mounting plug when not in use, as shown in FIG. 12 at 328. A seal can be positioned on or within the wall of the vessel 312 on the connecting member 322 to further protect against the inadvertent escape of vessel fluid 310 should the sealing bellows 306 fail.

A housing, as shown in FIG. 10 at 332, positioned outside of the vessel 312 can be provided, and an alternative force applying means, as shown schematically at 334 in FIG. 13, such as a solenoid, a motor, or a double acting cylinder, situated within this housing. Alternatively, this force applying means 334 can be positioned on the interior side of the vessel wall, or within the chamber 314 formed by the seal of the bellows 306. This alternate force applying means 334 can be operatively connected to the pressure plate 308 by way of the connecting member 322.

Figure 13A:
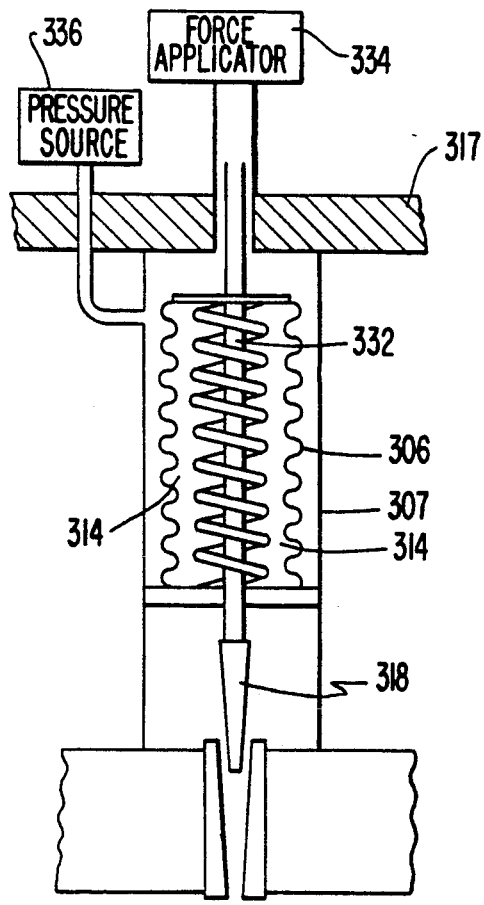
FIG. 13a is a view of a valve similar to that of FIG. 10 showing the plug insert configuration and with the sealed volume outside the bellows.
Figure 13B:
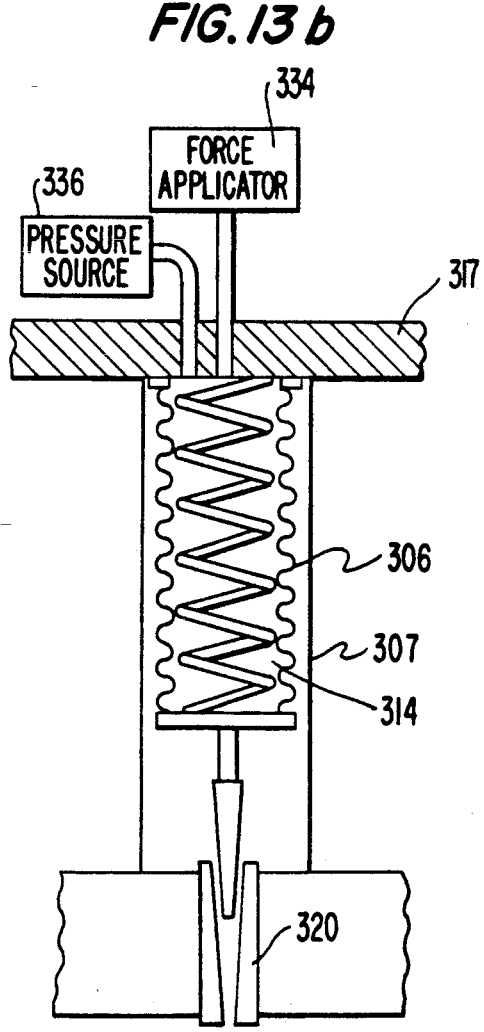
FIG. 13b is a view similar to FIG. 13a showing the sealed volume positioned inside the bellows.

It is also within the scope of this invention for the connecting member 322 to comprise little more than an internal bellows guide within the bellows chamber 314 and an operating force applied by simply pressurizing or depressurizing the bellows chamber 314 with a fluid, such as a compressed gas or hydraulic fluid, from a pressure source depicted schematically at 336 in FIG. 13 passing through an opening in the vessel wall 317 from a control position outside of the vessel. In the embodiment of FIG. 13b, the external pressure supplied from pressure source 336 tends to extend the bellows 306 and chamber 314 and the vessel pressure and/or biasing spring 316 tends to compress or shorten the sealed bellows chamber 314. The biasing spring 316 can be positioned within the bellows chamber 314 completely separated from the vessel fluid 310. The sealed chamber can also be formed outside of the bellows 306, as shown by the sealed chamber 315 of the embodiment in FIG. 13a. The valves of FIGS. 13a and 13b are set up to work inside of a pressure vessel. The bellows 306 can be used as the actuator to overcome its own spring force. Suitable firm stops can also be provided on the bellows and diaphragm seals to prevent travel beyond the needed or intended limits to thereby prevent unnecessary damage or wear to these flexible seals.

Designs of the valve portions of the valves of the present invention in addition to the valve portions previously described can be used in valves of the present invention, and examples thereof are shown in FIGS. 14-17.

Figure 14:
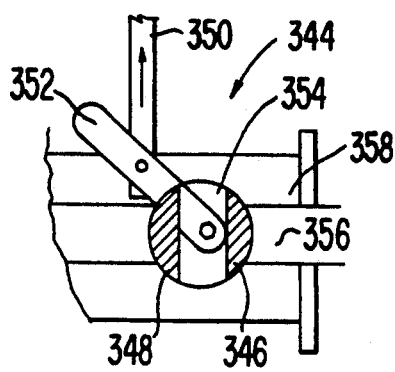
FIG. 14 is a sectional view of a ball-type valve of the present invention illustrated in a closed position.
Figure 15:
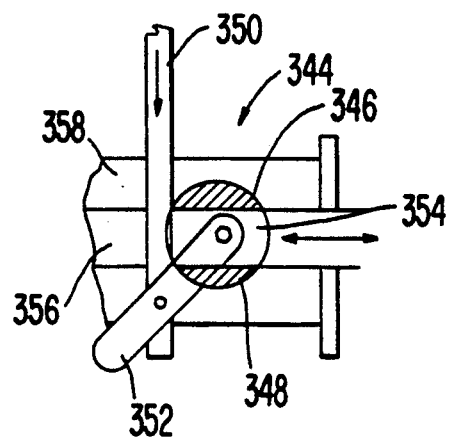
FIG. 15 is a view of the ball-type valve of FIG. 14 illustrated in an open position.

Referring to FIGS. 14 and 15 another valve apparatus of the present invention is shown generally at 344, and it includes a rotatable valve element such as a plug or ball 346 that is rotatable in a cavity 348. Examples of other rotatable ball valves are shown in U.S. Pat. Nos. 4,304,252 and 4,650,157. The valve ball 346 is rotated by longitudinally moving an elongated rod member 350. A linking lever member 352 is pivotally connected at one end to the ball 346 and pivotally connected at another point to the elongated rod member 350. Upward movement of the connecting rod member 350 produced by a suitable actuator mechanism draws the linking lever member 352 upward to rotate the ball 346 into a closed position, as shown in FIG. 14. This actuator mechanism can, for example, be that described or illustrated in FIG. 9. When in the closed position, the passageway 354 through the ball 346 is perpendicular to the passageway 356 of the valve support structure 358. Moving the connecting rod member 350 downward, as shown in FIG. 15, moves the linking lever member 352 downward as well and thereby rotates the ball 346 into the open position wherein the ball passageway 354 is aligned with the passageway 356 through the valve support structure 358. In lieu of the ball configuration any other suitable type of rotating element, such as a disc, can be used.

Figure 16:
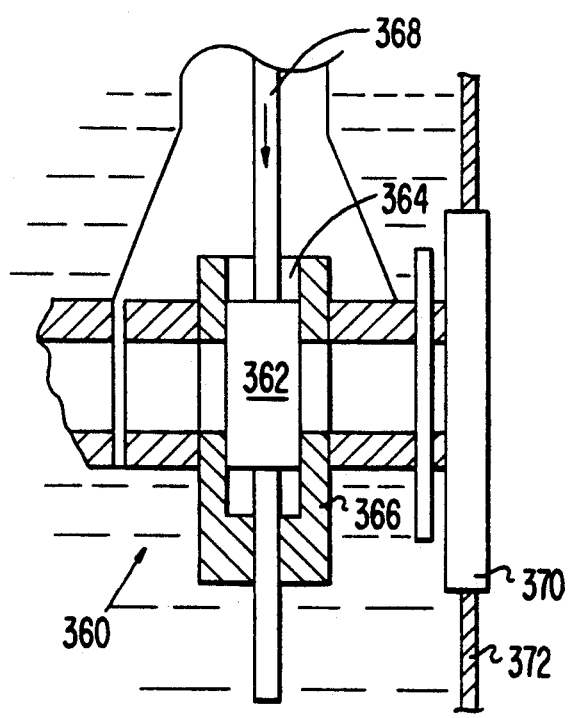
FIG. 16 is a sectional view of a gate valve of the present invention illustrated in the closed position.
Figure 17:
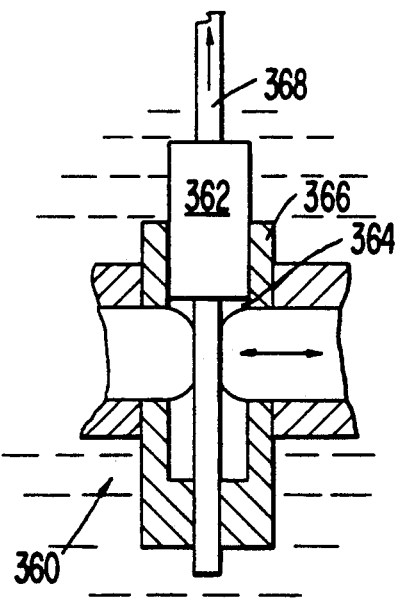
FIG. 17 is a view of the gate valve of FIG. 16 illustrated in an open position.

FIGS. 16 and 17 illustrate an alternative valve apparatus as shown generally at 360 which includes a sliding valve element 362. Examples of known sliding gate valves are shown in U.S. Pat. Nos. 2,606,571 and 4,052,036. The sliding valve element 362 is moved vertically with respect to a cavity 364 formed in a cavity forming structure 366 between a closed position as illustrated in FIG. 16 and an open position as illustrated in FIG. 17. This movement is effected by vertically moving a rod or connecting member 368 which is operatively attached to a suitable internal actuator, such as is shown in FIG. 9. FIG. 16 also shows a thickened boss 370 welded into the shell 372 of the vessel. This integral boss 370 can be used for mounting and attaching the internal valve apparatus to the vessel in lieu of the flange system as shown for example in FIGS. 1 and 5.

The internal valve designs described herein satisfactorily address the problems of vulnerability, thereby making the valve as reliable and immune to damage as is the containment vessel to which it is attached by its placement within the vessel walls and by providing external control functions. The natural shielding of the vessel shell wall eliminates the need for additional heavy shielding for the valve. Also, the probability of physical abuse by a workman or by vandals is minimized since this valve is mounted within the protective envelope of the vessel.

The flexible (diaphragm or bellows) seals of these nozzles eliminate the need for packing glands or other seals with rubbing surfaces and thereby remedy the problem of seal and packing gland leakage which is particularly important when dealing with hazardous and/or obnoxious substances. A highly reliable secondary seal is also provided and protects against the failure of the primary seal as a part of the actuator movement system.

The valves of the present invention can be readily configured to provide a fail closed operation independent of the vessel pressure, flow rate and downstream pressure. This satisfies the need for valves on process, storage and transportation vessels which are closed when no demand for field delivery is being made, as during process shut-down or actual transportation. Furthermore, the valve can be readily configured to provide a fail open, or hold last position characteristics, as needed, for example on process vessels or safety release vents. The valve designs of this invention can be activated by remote controls, automatic controls, or manual controls. They further can be adapted to be powered by human muscle, pressurized fluid, vacuum, electricity, heat, electromagnetic force and/or the pressure or temperature of the product contained in the vessel system itself.

The valve devices described herein thus are designed to be installed completely within the protective envelope of their pressure chambers and yet to be completely controllable from outside of the pressure vessel. The designs thereof need not and do not permit any trace leakage of the contained material to the outside of the vessel through the control mechanism communicating with the outside. By installing the entire valve mechanism and actuator totally within the protective envelope of the vessel, the valve and actuator system is made as immune to damage by external causes as the vessel itself is.

In summary, the valve actuators of this invention consist in essence of impermeable seals, preferably metal, sufficient in strength to withstand both the internal and external pressures which may be applied to it, and having a sufficient and flexible area to withstand without undue fatigue the normal flexure movement of the valve. This seal can take the form of a bellows or a diaphragm. The seal is arranged so that it always forms an impenetrable barrier to the passage of (fluid) material between the vessel and the control chamber. The seal can be attached by any convenient means, such as a stem or ratchet system, to the valve plug or port so that motion of the seal is transferred to the valve plug or port to open or close the valve. The connecting system can, but need not, provide a mechanical advantage to amplify the force or amplitude of the moving seal or to convert its linear motion into rotary motion, as by a rack and pinion gear drive, a ratchet, a lever or a hydraulic system.

The motion is imparted to the system by the use of positive or negative pressure or force applied to the control chamber outside of the seal in order to move the seal to another position. This force can be supplied by directly introducing a pressurized control fluid into the control chamber from the outside or by means of a direct mechanical linkage or control rod to the outside or preferably by means of a hydraulic cylinder and piston arrangement or electric gear motor arrangement contained entirely within the control chamber and pressurized or energized from the outside via suitable port(s). The bellows, which is preferably of a multi-ply design, can be used as the seal in high pressure applications. The diaphragm, which is also preferably multi-ply, can be used as the seal in lower pressure applications at a somewhat lower cost. The seal is protected from over extension by the design of the apparatus by means of positive stops. The actuator mechanism can be placed at any convenient point in the system, preferably entirely within the envelope of the vessel. The entire actuator mechanism and valve mechanism (if separate) can be designed to be removed from the vessel system, as for maintenance, without personnel entering the vessel. The mechanism is attached to the vessel in such a way that no essential part protrudes beyond the vessel envelope to thereby provide a point of purchase for striking objects. This can be accomplished by means of flush mounting flanges, cover plates or by mounting the mechanism entirely within the vessel or within internal piping of the vessel.

The device is designed preferably so that in its non-energized or relaxed state it is positively closed or open as is appropriate for the particular containment vessel nozzle. The internal pressure of the containment vessel tends to maintain the valve in its deenergized position. Positive shut off (or opening if desired) of the valve, regardless or whether or not the internal pressure is high, low or even negative, can be provided. Notwithstanding the above however, the device can be designed instead to maintain, once deenergized, the position the valve was last in, if needed.

The valve and/or actuator devices herein can be used with other safety systems including safety relief valves and internal excess flow valves, so as to for example provide an externally adjustable internal excess flow valve or pressure relief valve. Similarly, the valve system can be applied to the relief valve system so that the flow of material to the relief valve can be externally controlled, as for maintenance purposes. It is further within the scope of this invention to provide a remotely adjustable pressure relief valve for the fluid containment vessel.

The system of this invention which includes a vessel, an actuator mechanism and valve members can be manufactured from a wide variety of materials including metals, plastic, polymers, vitreous materials, combinations thereof, and especially heat and corrosion resistant materials such as stainless steels. The specific material or materials selected, as well as their form, depend in part on the chemicals being contained or transported in the vessel and the anticipated conditions of service. Careful considerations should be given in the design to use materials compatible with the environment to which they will be exposed.

The operative force mechanism must have sufficient design power to overcome the opposing internal and/or external pressures, the spring resistance of the seal, which is often substantial, and the ordinary binding and frictional forces of the entire mechanism. Additionally, the design should take advantage of and provide for large flexing surfaces on the sealing device (the bellows or the diaphragm) so that no segment of the flexing surface thereof is stressed to fatigue or permanent distortion. This allows the seal to have a nearly indefinite life.

It will be readily apparent to those skilled in the art that many modifications can be made to this valve design and fall within the scope of this invention. For example, the size, configuration and arrangement of the components can be changed to meet specific requirements. The connecting section can include one or more pivoting links or can be coupled to a rack and pinion gear device or to another hydraulic device, for example, to facilitate the operation, achieve a mechanical transformation or advantage, or simply to better fit into the available space. Also, soft valve components can be readily used in the relatively protected environs of the vessel interior, and this internal placement is safer from a fire standpoint than using the soft valve components externally. The valve can thereby have an extremely tight valve shutoff. The large available force of the actuator can be used to tightly shut off the valve with hard (metal-to-metal or ceramic) valve seats as well, if desired. Additionally an assortment of compression and/or tension springs can be used, as needed, to facilitate the operation of the actuator apparatus.

While this valve apparatus is primarily intended to be installed within the protective envelope of pressure vessels to form an improved material containment system, there are obvious advantages to this valve operator design independent of its interior installation aspect, as would be apparent to those skilled in the art.

Although the valves of the present invention were designed to operate in vessels, such as hydrogen sulfide cars and trucks, having pressures of four hundred to five hundred psig, they can be used for pressure ranges from full vacuum to about five thousand psig. For transportation applications, however, the most important range is from one hundred to one thousand psig, or generally above two hundred and fifty psig. In comparison, the typical diaphragm-operated valves develop problems when the pressures thereon exceed about twenty-five psig. Some though are constructed so that they can theoretically withstand pressures up to about one hundred and fifty psig. Their manufacturers, however, do not contemplate them being installed inside pressure vessels. The present valves can thus be effectively used to dispense fluid from one high pressure system to another.

Since the present valves operate in high pressure environments, they must develop large mechanical advantages and be able to withstand high stresses. These advantages, to allow operation of the valves under high pressures of hundreds of psi, are provided herein by pistons and cylinders, flexible diaphragms, and/or flexible bellows operated hydraulically, pneumatically or thermally. High hydraulic pressures and/or favorable ratios of working surface in the operator versus the valve plug develop high forces. A valve motor which uses a rack and pinion wheel to develop a high advantage in combination with a cylinder can also be used. Rods and levers can be used but less advantageously; for example, a control rod coming directly from the outside having its mechanical advantage developed by a screw can be used. The magnetic/electromagnetic valves are somewhat different however, since they use pilot control devices to create high pressure gradients with the product fluid itself and then use a piston cylinder arrangement to move the valve. Another valve of this invention uses electrically-operated actuator valves used for atmospheric uses and provides a housing according to this invention so that the valve can be used inside pressure tanks.

For each of these valves, operator sealing means which are independent of the function of the mechanical seal alone are provided. The sealing systems herein when used in these pressure systems are superior to packing seals, since packing seals leak, are subject to frictional wear and depend on tight clearances between rubbing parts to seal. Frictional wear, impact, abuse and even changes in temperature can cause these tight clearances to expand thereby defining a larger leak path for product to exit the vessel through the packing. For many commodities which have no significant odor or are non-hazardous in small concentrations, this can be "acceptable". However, for hydrogen sulfide, mercaptans, chlorine, ammonia, sulphur dioxide, hydrogen fluoride, hydrogen chloride, radioactive materials, nerve gases, high purity substances, disease causing substances, high value substances and the like, even small leaks during transportation are undesirable. Since full barrier membranes (flexible or inflexible) are included in the present valves to positively stop this leakage and to positively stop leakage or control fluid into the product, packing seals are advantageously not needed. In other words, no frictional or packing type of seal is needed to isolate the actuator from the product, rather an impermeable seal such as a bellows, diaphragm or rigid tube is used.

The valves herein preferably do not extend any distance beyond the tank bottom or the tank top. Rather, they are completely internal or recessed, including the stationary components thereof, and even the cover flanges and fasteners therefor are flush mounted. The valves are therefore less subject to impact or other destructive forces, which is especially advantageous when the valve is to be mounted on a transportation vessel carrying hazardous materials at high pressures. Additionally, the control system is protected by having no part thereof protruding beyond the protective envelope defined by the smooth vessel wall. This can be accomplished by removing the external parts, such as the control rod in the hydraulic pump, during transportation. Preferably though all critical parts of the control system and the valve(s) are installed entirely inside of the outer wall envelope of the vessel, as for example in a closed well with a flush mounting cover having a strength at least equal to that of the vessel wall itself. Ready means for remotely controlling the valve, such as when the top valve is controlled from the bottom of the car, can thereby be provided. The control systems can also be protected with one or more quick connect hydraulic fittings. Even the hydraulic pump can be installed, if desired, inside such a well though the present design does not make this necessary. Thus, there is no dependency on "sheer zones" or "sheer off" points on portions of the valve or control external to the vessel since there are no such points or zones. Also, no discharge piping is left in place during transportation if such piping is external to the vessel wall envelope or the wall itself.

From the foregoing detailed description, it will be evident that there are a number of additional changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. An internal valve for a pressure fluid containment vessel having a vessel port, said internal valve comprising:
    a valve seat associatable with a vessel port of a pressure fluid containment vessel;
    a valve member positionable generally inside of the fluid containment vessel and movable between a closed position against said valve seat to block the flow of fluid relative to the fluid containment vessel through the vessel port and an open position relative to said valve seat to allow the flow of fluid relative to the fluid containment vessel through the vessel port;
    a control chamber positionable generally in the fluid containment vessel and connected to said valve member;
    motive means for acting within said control chamber and thereby moving said valve member to at least one of the open and closed positions; and
    sealing means including a flexing surface connected to said valve member and positionable relative to the fluid containment vessel such that fluid pressure in the fluid containment vessel acts on said flexing surface and thereby biases said valve member towards at least one of the open and closed positions.

2. The internal valve of claim 1 wherein said sealing means seals said control chamber from fluid in the fluid containment vessel.

3. The internal valve of claim 1 wherein said valve seat is mountable directly in the vessel port.

4. The internal valve of claim 1 wherein said valve seat is spaceable from and in fluid communication with the vessel port.

5. The internal valve of claim 1 further comprising a tubing communicatable with the vessel port and having a tubing end in which said valve seat is seated.

6. The internal valve of claim 1 wherein said valve seat comprises a cylindrical seat removably threadable into the vessel port.

7. The internal valve of claim 6 wherein said valve seat includes an O-ring system disposable between said cylindrical seat and the vessel port.

8. The internal valve of claim 1 further comprising mounting flange means to which said valve seat is secured for mounting said valve seat to the fluid containment vessel.

9. The internal valve of claim 8 wherein said mounting flange means includes a flange and removable fastening members for securing said flange to the fluid containment vessel.

10. The internal valve of claim 9 wherein said removable fastening members comprise a plurality of Allen head cap screws.

11. The internal valve of claim 1 further comprising a removable blind flange removably securable over said valve seat and outside of the fluid containment vessel.

12. The internal valve of claim 1 wherein said flexing surface has an outside surface and is positionable so that fluid pressure in the fluid containment vessel acts directly on said outside surface.

13. The internal valve of claim 1 wherein said flexing surface has an inside surface and is positionable so that fluid pressure in the fluid containment vessel acts directly on said inside surface.

14. The internal valve of claim 1 wherein said valve member comprises a plug assembly, said plug assembly including a plug formed of a resilient material and a secondary circumferential valve member formed about said plug.

15. The internal valve of claim 14 wherein said secondary circumferential valve member is formed of metal.

16. The internal valve of claim 14 wherein said resilient material is compatible with the fluid to be contained in the fluid containment vessel.

17. The internal valve of claim 14 wherein said plug assembly defines an end of said control chamber.

18. The internal valve of claim 14 wherein said plug assembly is secured to an end of said control chamber.

19. The internal valve of claim 14 wherein said control chamber has at least one side thereof defined by said sealing means.

20. The internal valve of claim 19 wherein said sealing means is secured directly to said plug assembly.

21. The internal valve of claim 14 further comprising a sleeve securable relative to the fluid containment vessel and in which said plug assembly is positioned and movable.

22. The internal valve of claim 14 wherein said plug assembly includes a plug member and a rod connected to said plug member, and said motive means is secured to and acts on said rod.

23. The internal valve of claim 22 wherein said rod passes through said control chamber.

24. The internal valve of claim 22 wherein said rod is disposed outside of said control chamber.

25. The internal valve of claim 1 further comprising passageway means for directly communicating fluid in the fluid containment vessel with said flexing surface.

26. The internal valve of claim 1 wherein said control chamber has its volume variably dependent upon whether said valve member is in the open or closed position.

27. The internal valve of claim 1 wherein said control chamber is rigidly connectable to the fluid containment vessel.

28. The internal valve of claim 1 further comprising rigid connecting means for rigidly connecting said control chamber to the fluid containment vessel.

29. The internal valve of claim 28 further comprising a mounting flange securable to the fluid containment vessel and to which said rigid connecting means is rigidly mounted.

30. The internal valve of claim 29 wherein said valve seat is seated in said mounting flange.

31. The internal valve of claim 29 wherein said mounting flange is removably mountable over the vessel port and to the fluid containment vessel.

32. The internal valve of claim 1 further comprising said valve member including a plug assembly, and a sleeve in which said plug assembly is positioned and movable and an end mounting structure secured to an outer end of said sleeve.

33. The internal valve of claim 32 wherein said motive means passes through said end mounting structure.

34. The internal valve of claim 32 wherein said end mounting structure is mounted via a removable securing means to a flange secured to said sleeve.

35. The internal valve of claim 32 wherein said sleeve includes an internal resilient surface facing said sealing means for protecting said sealing means in the event said sealing means impacts said sleeve.

36. The internal valve of claim 32 wherein said sleeve includes at least one port therethrough for providing fluid communication with the fluid within the fluid containment vessel and the exterior of said sealing means.

37. The internal valve of claim 1 wherein said motive means comprises a source of pressure positioned outside of the fluid containment vessel.

38. The internal valve of claim 1 wherein said motive means comprises a source of pressure positioned inside of the fluid containment vessel.

39. The internal valve of claim 1 wherein said motive means comprises a piston-cylinder mechanism.

40. The internal valve of claim 39 wherein said piston-cylinder mechanism includes a pump.

41. The internal valve of claim 40 wherein said pump is positioned outside of the fluid containment vessel.

42. The internal valve of claim 39 wherein said piston-cylinder mechanism comprises a double-acting piston-cylinder system.

43. The internal valve of claim 39 wherein said piston-cylinder mechanism includes a pair of chambers and a housing for said chambers, said motive means includes a rigid member extending out from said housing, and said piston-cylinder mechanism includes a first passageway connecting with said first chamber and a second passageway connecting with said second chamber, said first and second passageways passing through said rigid member.

44. The internal valve of claim 43 wherein said piston-cylinder mechanism includes a first tube communicating with said first passageway and communicatable with the exterior of the fluid containment vessel, and a second tube communicating with said second passageway and with the exterior of the fluid containment vessel.

45. The internal valve of claim 44 wherein said motive means includes a pump positioned outside of the fluid containment vessel and in fluid communication with said first and second tubes.

46. The internal valve of claim 44 wherein said motive means includes control means positioned outside of the fluid containment vessel for controlling the operation of said piston-cylinder mechanism.

47. The internal valve of claim 44 wherein said first and second tubes have first and second tube ends and first and second self-closing hydraulic fittings at said first and second tube ends, respectively.

48. The internal valve of claim 39 wherein said motive means includes a source of pressurized fluid operatively connected to said piston-cylinder mechanism and positionable outside of the fluid containment vessel.

49. The internal valve of claim 48 wherein said source of pressurized fluid is selected from the group of pressurized grease, gas and hydraulic fluid sources.

50. The internal valve of claim 39 wherein said piston-cylinder mechanism comprises a double-acting cylinder and pressure equalizing means allowing for equalizing pressure on both sides of said double-acting cylinder and for said valve member to be returned to its normal position.

51. The internal valve of claim 50 wherein said normal position is the closed position.

52. The internal valve of claim 50 wherein said pressure equalizing means allows said valve member to return to the closed position, which is its normal position, as said flexing surface relaxes.

53. The internal valve of claim 50 wherein said pressure equalizing means includes first and second passageways communicating with said first and second tubes, respectively, and communicating means for selectively communicating said first and second passageways.

54. The internal valve of claim 53 wherein said communicating means comprises a cap screw which can be loosened to a first position providing communication between said first and second passageways and tightened to a second position isolating said first and second passageways from each other.

55. The internal valve of claim 1 further comprising pressurization means communicating directly with said control chamber for moving said valve member towards at least one of the open and closed positions.

56. The internal valve of claim 1 wherein said motive means includes a biasing spring positioned outside said control chamber and biasing said valve member towards at least one of the open and closed positions.

57. The internal valve of claim 1 further comprising a biasing spring positioned in said control chamber and biasing said valve member towards at least one of the open and closed positions.

58. The internal valve of claim 57 wherein said motive means includes a piston rod and said biasing spring is positioned about said piston rod.

59. The internal valve of claim 1 wherein said flexing surface biases said valve member towards the closed position.

60. The internal valve of claim 1 wherein said flexing surface biases said valve member towards the open position.

61. The internal valve of claim 1 wherein said motive means includes a double-acting cylinder mechanism, said double-acting cylinder mechanism includes first and second chambers, a housing for said first and second chambers, a piston rod and a seal surrounding said piston rod at said housing.

62. The internal valve of claim 1 further comprising a valve body portion connectable to the fluid containment vessel for supporting said valve seat, said valve member, said control chamber and said sealing means.

63. The internal valve of claim 62 wherein said valve body portion is positioned generally between said valve seat and said control chamber.

64. The internal valve of claim 62 wherein said valve body portion includes a flanged outlet positionable at the vessel port and communicating through a passageway with said valve seat.

65. The internal valve of claim 64 wherein said passageway is curved to form a generally ninety degree angle.

66. The internal valve of claim 62 wherein said valve body portion is formed of metal.

67. The internal valve of claim 1 wherein said flexing surface comprises a bellows formed of a strong flexible material selected from the group of metal, plastic and rubber.

68. The internal valve of claim 67 wherein said strong flexible material comprises stainless steel.

69. The internal valve of claim 1 wherein said flexing surface comprises a sealed bellows element.

70. The internal valve of claim 1 wherein said flexing surface comprises a diaphragm sealing element.

71. The internal valve of claim 70 wherein said diaphragm sealing element is formed of a strong flexible material selected from the group of metal, plastic and rubber.

72. The internal valve of claim 71 wherin said strong flexible material comprises stainless steel.

73. The internal valve of claim 70 wherein said diaphragm sealing element is formed of a laminated or multi-layer construction.

74. The internal valve of claim 70 wherein said sealing means includes first and second body portions secured together and defining a cavity therebetween, said diaphragm sealing element being disposed in said cavity.

75. The internal valve of claim 74 wherein said control chamber is in said cavity.

76. The internal valve of claim 74 wherein said motive means includes a pressure plate member secured to said diaphragm sealing element and movable therewith.

77. The internal valve of claim 76 wherein said valve seat defines a valve seat opening having a cross-sectional area and said pressure plate member has an effective cross-sectional area in said control chamber which is substantially greater than the cross-sectional area of said valve seat opening.

78. The internal valve of claim 76 wherein said motive means includes connecting means for connecting said pressure plate member to said valve member.

79. The internal valve of claim 78 wherein said connecting means includes a rod connected to said pressure plate member and a yoke member connected to said rod and to said valve member.

80. The internal valve of claim 79 wherein said yoke member surrounds a valve support portion.

81. The internal valve of claim 74 wherein said motive means include a passageway communicating with said control chamber and a source of pressurized fluid acting on said passageway and disposable outside of the fluid containment vessel.

82. The internal valve of claim 81 wherein said passageway defines a first passageway, said control chamber defines a first sealed control chamber, said flexing surface defines a surface of a second sealed control chamber, said motive means includes a second passageway communicating with said second sealed control chamber and said source of pressurized fluid, and said source of pressurized fluid acts on said second sealed control chamber through said first and second passageways.

83. The internal valve of claim 74 wherein one of said first and second body sections includes at least one passageway means therethrough for communicating said flexing surface with fluid pressure in the fluid containment vessel.

84. The internal valve of claim 1 wherein said motive means includes a pressurized fluid passageway communicating with said control chamber.

85. The internal valve of claim 1 wherein said control chamber includes control chamber fluid, and said motive means includes fluid heating means for heating said control chamber fluid.

86. The internal valve of claim 85 wherein said fluid heating means includes exchange means for indirect heat exchange with a separate heating fluid.

87. The internal valve of claim 85 wherein said heating means includes an electrical conductor.

88. The internal valve of claim 1 wherein said motive means includes a movable member passing through said control chamber and connected to said flexing surface.

89. The internal valve of claim 88 wherein said movable member has an end positionable outside of the fluid containment vessel.

90. The internal valve of claim 1 wherein said motive means includes a piston-cylinder operatively connected to said valve member, and spring means positioned in said control chamber and operatively connected to said piston-cylinder for biasing said valve member to one of the open and closed positions.

91. The internal valve of claim 1 wherein said motive means includes a rod member, and said flexing surface includes a bellows positioned about at least a portion of said rod member.

92. The internal valve of claim 91 wherein said sealing means includes at least one passageway means for communicating the interior of said bellows with fluid in the fluid containment vessel.

93. The internal valve of claim 92 wherein said passageway means is disposed directly outside of said rod member.

94. The internal valve of claim 91 wherein said motive means includes a pressure plate to which said rod member is secured.

95. The internal valve of claim 94 wherein said bellows is at least somewhat compressed in length at all positions of said pressure plate relative to said control chamber.

96. The internal valve of claim 94 wherein said bellows is secured and sealed to said pressure plate.

97. The internal valve of claim 91 further comprising a body member generally encircling said control chamber and to which said sealing means is sealed.

98. The internal valve of claim 97 wherein said body member is sealable relative to said sealing means so as to prevent the flow of fluid from the fluid containment vessel to an area defined between said body member and one said sealing means and said bellows.

99. The internal valve of claim 91 wherein said bellows includes a plurality of circumferential grooves along its length, and said sealing means includes a plurality of spaced rings positioned in said grooves.

100. The internal valve of claim 91 wherein said sealing means includes said bellows being actuable on by fluid pressure in the fluid containment vessel acting on and thereby biasing said valve member towards a preferred position.

101. The internal valve of claim 1 wherein said motive means includes spring means positioned in said control chamber for biasing said valve member to one of the closed and open positions.

102. The internal valve of claim 101 wherein said motive means further comprises a conduit communicating with said control chamber and through which a pressurized fluid can be injected into said control chamber.

103. The internal valve of claim 102 wherein said motive means further comprises a source of pressurized fluid positionable outside of the fluid containment vessel and communicating with said conduit through said control chamber.

104. The internal valve of claim 1 wherein said control chamber has a control chamber end, and said motive means includes a pressure plate at said control chamber end and moving means for moving said pressure plate relative to said control chamber.

105. The internal valve of claim 104 wherein said pressure plate is sealed to a lower end of said sealing means and is movable therewith by said motive means.

106. The internal valve of claim 104 wherein said valve member comprises an elongated gate valve member.

107. The internal valve of claim 104 wherein said pressure plate is adjacent to said valve seat when said valve member is in the closed position.

108. The internal valve of claim 104 wherein said motive means comprises a hand-operated screw jack extendible from outside of the fluid containment vessel and connected to said pressure plate.

109. The internal valve of claim 108 wherein said motive means includes channel means for defining a screw channel through which said hand-operated screw jack passes, said hand-operated screw jack being removable from said screw channel when not in use, and a mounting plug insertable in said screw channel when said hand-operated screw jack has been removed therefrom.

110. The internal valve of claim 1 wherein said valve member comprises an elongated gate valve member.

111. The internal valve of claim 1 wherein said valve member comprises a globe valve.

112. The internal valve of claim 1 wherein said motive means includes a piston and moving means for moving said piston relative to said valve seat, said valve member being secured to and movable with said piston.

113. The internal valve of claim 112 wherein said moving means is positionable outside of the fluid containment vessel.

114. The internal valve of claim 112 wherein said moving means is positionable inside of the fluid containment vessel.

115. The internal valve of claim 112 wherein said moving means is positioned within said control chamber and within said sealing means.

116. The internal valve of claim 1 wherein said valve seat is defined by a cavity, and said valve member comprises a rotatable valve element rotatable in said cavity.

117. The internal valve of claim 116 wherein said rotatable valve element comprises a ball having a fluid passageway therethrough.

118. The internal valve of claim 116 wherein said motive means includes linking lever means attached to said rotatable valve element for rotating said rotatable valve element.

119. The internal valve of claim 118 wherein said linking lever means includes a linking lever member, and said motive means further comprises an elongated rod pivotally connected to said linking lever member.

120. The internal valve of claim 118 wherein said motive means includes actuator means for moving said linking lever member.

121. The internal valve of claim 120 wherein said actuator means includes a piston-cylinder arrangement.

122. The internal valve of claim 116 wherein said rotating element comprises a disc element.

123. The internal valve of claim 1 wherein said valve member comprises a sliding valve element slidable perpendicularly relative to said valve seat between the open and closed positions.

124. The internal valve of claim 123 wherein said valve member further comprises a connecting rod operatively connected to said motive means and to said sliding valve member for causing said sliding valve element to slide perpendicularly.

125. The internal valve of claim 1 further comprising flange mounting means for attaching said control chamber to an inside wall of the fluid containment vessel.

126. The internal valve of claim 1 further comprising thickened boss means weldable to the fluid containment vessel for mounting said control chamber to the fluid containment vessel.

127. The internal valve of claim 1 wherein said control chamber has a movable plate end structurally connected to said valve member for moving said valve member between the open and closed positions, and said motive means includes a bias spring in said control chamber and biasing against said movable plate end and a source of pressure acting on said flexing surface.

128. The internal valve of claim 127 wherein said source of pressure acts directly on an inside surface of said flexing surface.

129. The internal valve of claim 127 wherein said source of pressure acts directly on an outside surface of said flexing surface.

130. An internal valve for a pressurized fluid containment vessel having a vessel port, said internal valve comprising: a valve seat associatable with a vessel port of a pressurized fluid containment vessel;

a valve member positionable generally inside of the pressurized fluid containment vessel and movable between a closed position against said valve seat to prevent the flow of fluid relative to the pressurized fluid containment vessel through the vessel port and an open position relative to said valve seat to allow the flow of fluid relative to the pressurized fluid containment vessel through the vessel port;

a flexible enclosure connected to said valve member and defining at least part of a chamber, said flexible enclosure including a flexible enclosure surface, said flexible enclosure being positionable in the pressurized fluid containment vessel so that fluid pressure in the pressurized fluid containment vessel bears on said flexible enclosure surface and thereby biases said valve member towards one of the open and closed positions; and motive means positioned at least partially in said chamber and controllable from outside of the pressurized fluid containment vessel for moving said valve member to at least one of the open and closed positions.

131. The internal valve of claim 130 wherein said flexible enclosure surface comprises a bellows positionable in the pressurized fluid containment vessel.

132. The internal valve of claim 130 wherein said flexible enclosure surface comprises a diaphragm positionable in the pressurized fluid containment vessel.

133. The internal valve of claim 130 wherein said valve seat includes a valve seat orifice positionable within the pressurized fluid containment vessel and conduit means for communicating said valve seat orifice with the vessel port.

134. The internal valve of claim 130 wherein said valve member comprises a sliding valve member.

135. The internal valve of claim 130 wherein said valve member comprises an elongated gate valve element.

136. The internal valve of claim 130 wherein said valve member comprises a valve plug.

137. The internal valve of claim 130 wherein said valve member comprises a globe valve.

138. The internal valve of claim 130 wherein said flexible enclosure surface is positionable in the pressurized fluid containment vessel such that fluid pressure in the pressurized fluid containment vessel acts directly thereon to thereby bias and move said valve member towards the closed position.

139. The internal valve of claim 130 wherein said flexible enclosure is positionable in the pressurized fluid containment vessel such that fluid pressure in the pressurized fluid containment vessel acts directly on said flexible enclosure surface to thereby bias and move said valve member towards the open position.

140. The internal valve of claim 130 wherein said flexible enclosure includes passageway means for communicating the interior of said flexible enclosure with pressurized fluid in the pressurized fluid containment vessel.

141. The internal valve of claim 130 wherein said flexible enclosure includes passageway means for communicating the exterior of said flexible enclosure surface with pressurized fluid in the pressurized fluid containment vessel.

142. The internal valve of claim 130 further comprising piping means for providing fluid communication between said valve seat and the vessel port.

143. The internal valve of claim 142 wherein said piping means includes flange mounting means at an end thereof spaced from said valve seat for mounting said piping means to the pressurized fluid containment vessel.

* * * * *